(12) United States Patent
Markram et al.

(10) Patent No.: US 10,387,767 B2
(45) Date of Patent: Aug. 20, 2019

(54) ORGANIZING NEURAL NETWORKS

(75) Inventors: Henry Markram, Lausanne (CH); Rodrigo de Campos Perin, Lausanne (CH); Thomas K. Berger, Berkeley, CA (US)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 1157 days.

(21) Appl. No.: 13/566,128

(22) Filed: Aug. 3, 2012

(65) Prior Publication Data
US 2012/0323833 A1    Dec. 20, 2012

Related U.S. Application Data

(63) Continuation of application No. PCT/EP2011/000515, filed on Feb. 4, 2011.

(60) Provisional application No. 61/301,781, filed on Feb. 5, 2010.

(51) Int. Cl.
*G06N 3/04* (2006.01)
*G06F 3/08* (2006.01)
*G06N 3/08* (2006.01)

(52) U.S. Cl.
CPC ............ *G06N 3/0454* (2013.01); *G06N 3/08* (2013.01); *G06N 3/082* (2013.01)

(58) Field of Classification Search
None
See application file for complete search history.

(56) References Cited

U.S. PATENT DOCUMENTS 5,712,959 A    1/1998   Streit

FOREIGN PATENT DOCUMENTS

| EP | 0268972 | 6/1988 |
|---|---|---|
| JP | H03-121625 | 5/1991 |
| JP | 05-505268 | 8/1993 |
| JP | 06-110862 | 4/1994 |
| JP | H08-315141 | 11/1996 |
| JP | 2002-261621 | 9/2002 |
| JP | 2003-513501 | 4/2003 |
| WO | 92/11605 | * 7/1992 |

(Continued)

OTHER PUBLICATIONS

Bullmore, Ed, and Olaf Sporns. "Complex brain networks: graph theoretical analysis of structural and functional systems." Nature Reviews Neuroscience10.3 (2009): 186-198.*

(Continued)

*Primary Examiner* — Daniel T Pellett
(74) *Attorney, Agent, or Firm* — Fish & Richardson P.C.

(57) ABSTRACT

Methods, systems, and apparatus, including computer programs encoded on a computer storage medium, for organizing trained and untrained neural networks. In one aspect, a neural network device includes a collection of node assemblies interconnected by between-assembly links, each node assembly itself comprising a network of nodes interconnected by a plurality of within-assembly links, wherein each of the between-assembly links and the within-assembly links have an associated weight, each weight embodying a strength of connection between the nodes joined by the associated link, the nodes within each assembly being more likely to be connected to other nodes within that assembly than to be connected to nodes within others of the node assemblies.

30 Claims, 14 Drawing Sheets

(56) References Cited

FOREIGN PATENT DOCUMENTS

| WO | 01/31784 | 5/2001 |
|---|---|---|
| WO | 2004/114145 | 12/2004 |
| WO | WO2004114145 A1 | 12/2004 |

OTHER PUBLICATIONS

Boccaletti, Stefano, et al. "Complex networks: Structure and dynamics." Physics reports 424.4 (2006): 175-308.*
Sporns, Olaf, et al. "Organization, development and function of complex brain networks." Trends in cognitive sciences 8.9 (2004): 418-425.*
Fuchs, Einat, et al. "The formation of synchronization cliques during the development of modular neural networks." Physical biology 6.3 (2009): 036018.*
Newman, Mark EJ. "Assortative mixing in networks." Physical review letters89.20 (2002): 208701.*
De Franciscis, Sebastiano, Samuel Johnson, and Joaquin J. Torres. "Enhancing neural-network performance via assortativity." Physical Review E 83.3 (2011): 036114.*
Newman, Mark EJ. "Mixing patterns in networks." Physical Review E 67.2 (2003): 026126.*
Price, David, et al. "Pairwise neural network classifiers with probabilistic outputs." Neural Information Processing Systems. vol. 7. 1994.*
Schneidman, Elad, et al. "Weak pairwise correlations imply strongly correlated network states in a neural population." Nature 440.7087 (2006): 1007-1012.*
Assis, T. M. L., A. R. Nunes, and D. M. Falcao. "Mid and long-term voltage stability assessment using neural networks and quasi-steady-state simulation." Power Engineering, 2007 Large Engineering Systems Conference on. IEEE, 2007.*
Schmidt, A., and Bandar, Z. "Modularity: a concept for new neural network architectures." Proc. IASTED International Conf. Computer Systems and Applications. 1998.*
European Office Action issued in European Application No. 11703146.8 dated Sep. 25, 2015, 7 pages.
Chinese Office Action issued in CN2011800171921 dated Sep. 3, 2014, including English Translation, 17 pages.
Boccaletti, S., et al., "Complex networks: Structure and dynamics", Physics Reports, North-Holland, vol. 424, No. 4-5, Feb. 1, 2006 (Feb. 1, 2006), pp. 175-308.
Bullmore, Ed, et al., "Complex brain networks: graph theoretical analysis of structural and functional systems", http://www.indiana.edu/{cortex Nature Reviews Neuroscience, vol. 10 Mar. 2009 (Mar. 2009), pp. 186-198.
Fuchs, Einat, et al., "The formation of synchronization cliques during the development of modular neural networks; Development of synchronization in neural networks", Physical Biology, Institute of Physics Publishing, Bristol, GB, vol. 6, No. 3, Sep. 1, 2009 (Sep. 1, 2009), 12 pages.
Migliore, M., et al., "Parallel network simulations with Neuron", Journal of Computational Neuroscience, Kluwer Academic Publishers, BO, vol. 21, No. 2, May 26, 2006 (May 26, 2006), pp. 119-129.
Perin, Roderigo, et al., "A synaptic organizing principle for cortical neuronal groups" , Proceedings of the National Academy of Sciences of the United States (PNAS), National Academy of Science, US, vol. 108, Mar. 29, 2011 (Mar. 29, 2011), 12 pages.
Van den Heuvel, M.P., et al., "Small-world and scale-free organization of voxel-based resting-state functional connectivity in the human brain", http://www.sciencedirect.com, NeuroImage, vol. 43, No. 3 Aug. 22, 2008 (Aug. 22, 2008), pp. 528-539.
International Search Report and Written Opinion of the International Searching Authority, or the Declaration issued in PCT/EP2011/000515 dated May 9, 2011, 16 pages.
Chinese Office Action issued in Chinese Application No. 2011800171921 dated Apr. 3, 2015, 8 pages (with English translation).
Boccaletti, S., et al., 'Complex networks: Structure and dynamics', Physics Reports, North-Holland.
Anthony et al., "A study of data compression using neural networks and principal component analysis," Biomedical Applications of Digital Signal Processing, IEEE Colloquium on, pp. 2/1-2/5, Nov. 30, 1989.
Hisashi Kashima, "Development of Bayesian Networks and Probabilistic Information Processing," Journal of the Japanese Society for Artificial Intelligence, Japan, The Japanese Society for Artificial Intelligence , May 1, 2007, vol. 22, No. 3, pp. 344-351.
Notice of Allowance issued in Japanese Application No. 2012-551552 dated Oct. 27, 2015, 6 pages (with English translation).
Notice of Allowance issued in Japanese Application No. 2014-148783 dated Nov. 10, 2015, 6 pages (with English translation).
Kashima, "Survey of Network Structure Prediction Methods," (2007), pp. 344-351 with English summary.
European Office Action issued in European Application No. 11703146.8 dated Feb. 24, 2014, 7 pages.
Korean Notice of Preliminary Rejection in International Application No. 10-2012-7023174, dated Apr. 20, 2017, 6 pages (with English Translation).
Office Action issued in U.S. Appl. No. 14/838,013 dated Sep. 1, 2016, 23 pages.
Office Action issued in U.S. Appl. No. 14/838,013 dated Feb. 9, 2017. 14 pages.
Sun, Ron. "Schemas, logics, and neural assemblies." Applied Intelligence 5.2 (1995): 83-102.
Farkas, Illes, et al. "Weighted network modules." New Journal of Physics 9.6 (2007): 180.

* cited by examiner

ORGANIZING NEURAL NETWORKS

CROSS-REFERENCE TO RELATED APPLICATIONS

This application is a continuation of PCT Application No. PCT/EP2011/000515, filed Feb. 4, 2011, which claims the benefit of U.S. patent application Ser. No. 61/301,781 filed Feb. 5, 2010, the contents of both of which are incorporated herein by reference.

BACKGROUND

This specification relates to approaches to organizing trained and untrained neural networks, and to methods of organizing of neural networks.

Neural networks are devices that are inspired by the structure and functional aspects of networks of biological neurons. In particular, neural networks mimic the information encoding and other processing capabilities of networks of biological neurons using a system of interconnected constructs called "nodes." The arrangement and strength of connections between nodes in a neural network determines the results of information processing or information storage by a neural network.

Neural networks can be "trained" to produce a desired signal flow within the network and achieve desired information processing or information storage results. In general, training a neural network will change the arrangement and/or strength of connections between nodes during a learning phase. A neural network can be considered "trained" when sufficiently appropriate processing results are achieved by the neural network for given sets of inputs.

Neural networks can be used in a variety of different devices to perform non-linear data processing and analysis. Non-linear data processing does not satisfy the superposition principle, i.e., the variables that are to be determined cannot be written as a linear sum of independent components. Examples of contexts in which non-linear data processing is useful include pattern and sequence recognition, novelty detection and sequential decision making, complex system modeling, and systems and techniques in a variety of other contexts

SUMMARY

This specification describes approaches to organizing trained and untrained neural networks and methods of organizing of neural networks. Research into the organization of biological neurons in the rat neocortex has yielded clues as to how the nodes in neural networks can advantageously be organized. Neural networks with interconnections that mimic the organization of biological neurons in the rat neocortex can be trained to achieve improved information processing and/or information storage.

In a first aspect of the subject matter described in this specification, a neural network device is implemented in hardware, in software, or in a combination thereof. The neural network device includes a collection of node assemblies interconnected by between-assembly links, each node assembly itself comprising a network of nodes interconnected by a plurality of within-assembly links, wherein each of the between-assembly links and the within-assembly links have an associated weight, each weight embodying a strength of connection between the nodes joined by the associated link, the nodes within each assembly being more likely to be connected to other nodes within that assembly than to be connected to nodes within others of the node assemblies.

In a second aspect of the subject matter described in this specification, a machine-implemented method of forming a neural network device includes forming a network of nodes implemented in hardware, in software, or in a combination thereof, and assigning or reassigning links between nodes of the network by connecting or disconnecting nodes with a probability that embodies a number of common neighbors shared by the nodes.

These and other aspects can include one or more of the following features. Weights associated with the between-assembly links can embody training of the neural device to a particular purpose. Within-assembly links can embody the training of the neural device to the particular purpose to a lesser extent than the between-assembly links. Nodes can be connected and the node assemblies formed according to pairwise connectivity profiles. Variance in average weight within each node assembly can generally decrease for node assemblies having higher numbers of links. An average strength of interconnection with each respective node assembly can asymptotically approach a respective limit as the number of links within the respective node assembly exceeds the number of nodes within the respective node assembly. For example, the respective limits can be substantially identical. For node assemblies having a number of within-assembly links that is smaller than a number of nodes within the same node assembly, magnitudes of the weights of the within-assembly links can be associated with distinguishably discrete levels of a set of levels. For example, each discrete level can be associated with a different number of nodes within the assembly. A neural network device can include an adaptor component configured to change the magnitude of each weight of the within-assembly links based on a number of other nodes within the assembly of each within-assembly link. For example, an adaptor component can be configured to change the magnitude of each weight before the neural network device is trained. Such neural network devices can be untrained. A neural network device can include an adaptor component configured to change a probability of connection between nodes in each node assembly based on a number of nodes within the node assembly. For example, an adaptor component can be configured to change the magnitude of each weight before the neural network device is trained. Links can include reciprocal links and non-reciprocal links. The non-reciprocal links can be about twice as common as the reciprocal links. Nodes within an assembly can be about twice as likely to be connected to other nodes within that assembly than to be connected to nodes within others of the node assemblies. A number of node assemblies having between ten and 100 nodes can be greater than a number of node assemblies having less than ten and more than 100 nodes. A neural network device can have between ten and 100 node assemblies. Assigning or reassigning can be repeated until a quasi steady-state is reached. Nodes can be connected according to pairwise connectivity profiles. A network of nodes can be trained, for example, by weighting links within the node assemblies with relatively stable weights and weighting links between node assemblies to embody the training while leaving the weights of links within the node assemblies relatively unchanged. Weights can be assigned to each link between first and second nodes based on a number of nodes commonly connected to both the first and second nodes. An initial set of links can be assigned according to either a random assignment processes or a process in which link assignments are made in accordance with a probability of two nodes being linked. An untrained neural network device can be formed by the method. Assigning or reassigning can be repeated until the number of links within each respective node assembly exceeds the number of nodes within that respective node assembly. Links in respective node assemblies can be weighted with weights that approach limits as the number of links exceeds the number of nodes The limits for node assemblies of different sizes can be substantially the same.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
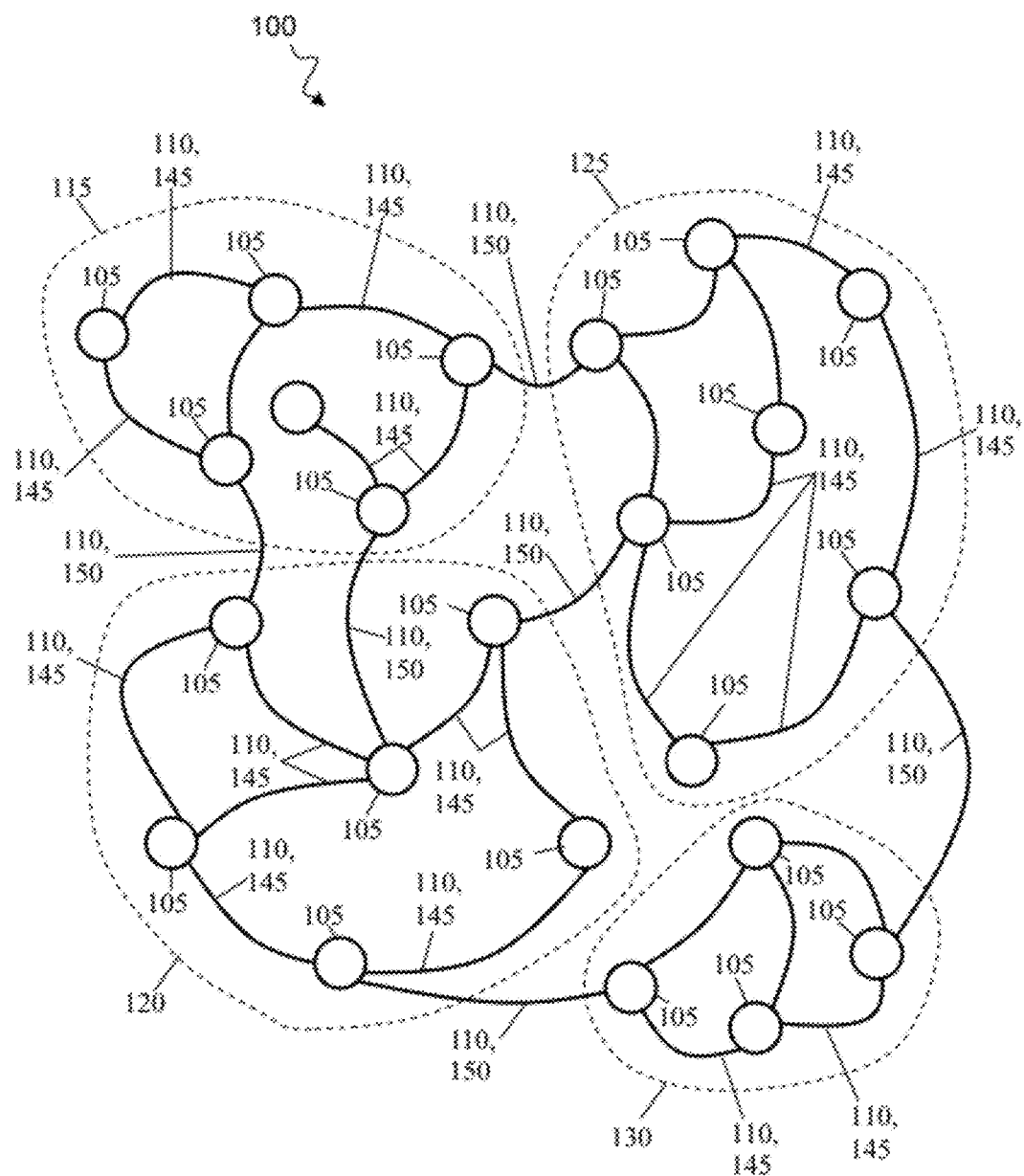
FIG. 1 is a schematic representation of a neural network device.
Figure 2A:
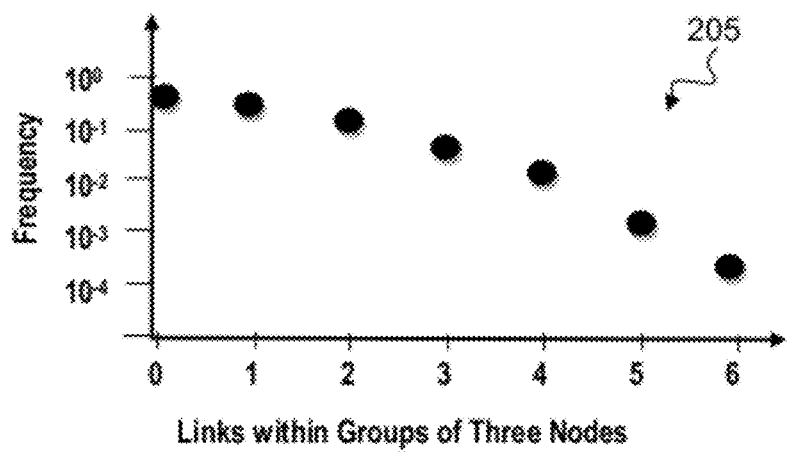
FIGS. 2A-2F are graphs that present illustrative examples of frequencies at which different numbers of links can appear within groups of different numbers of nodes.
Figure 2B:
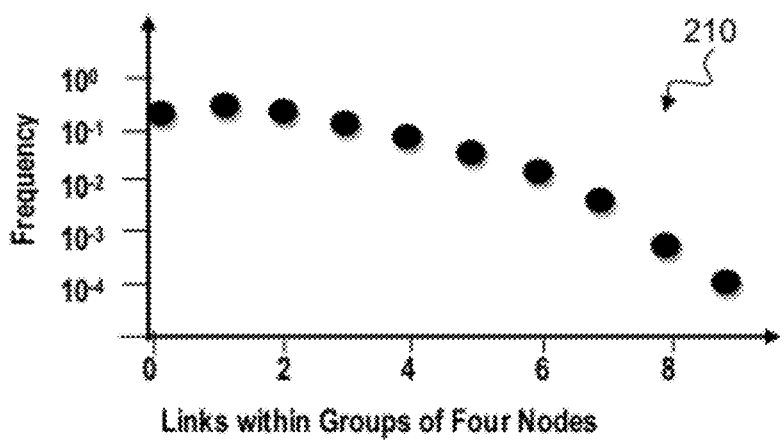
Figure 2C:
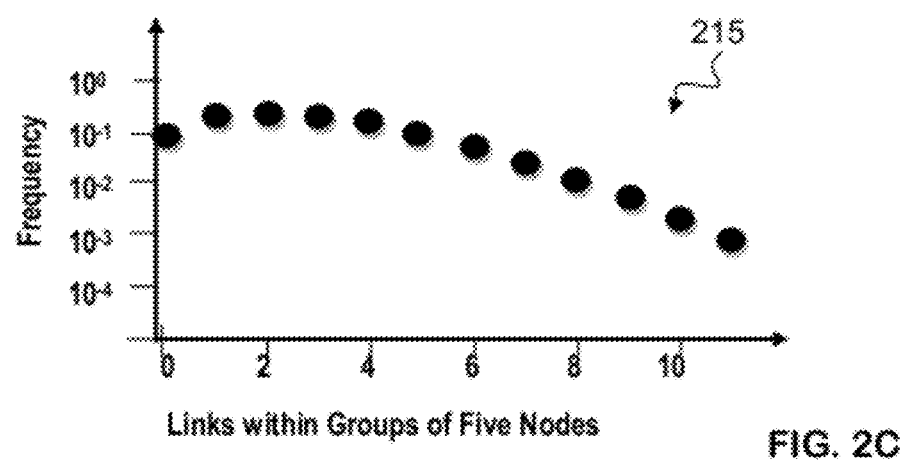
Figure 2D:
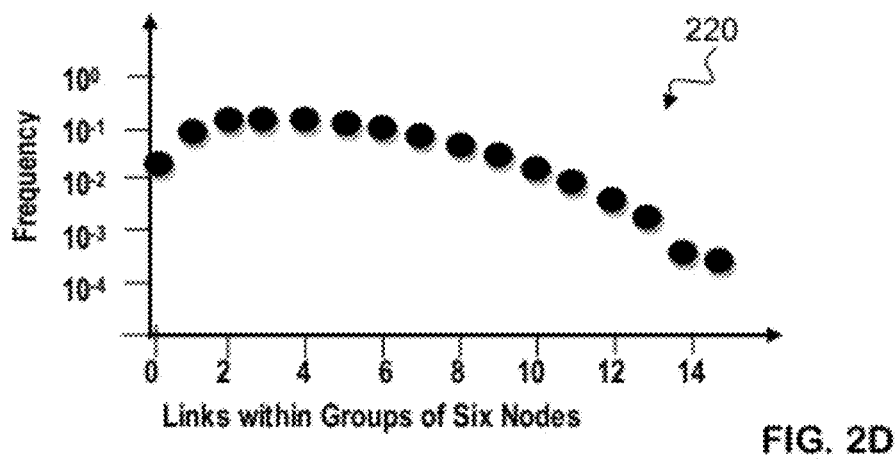
Figure 2E:
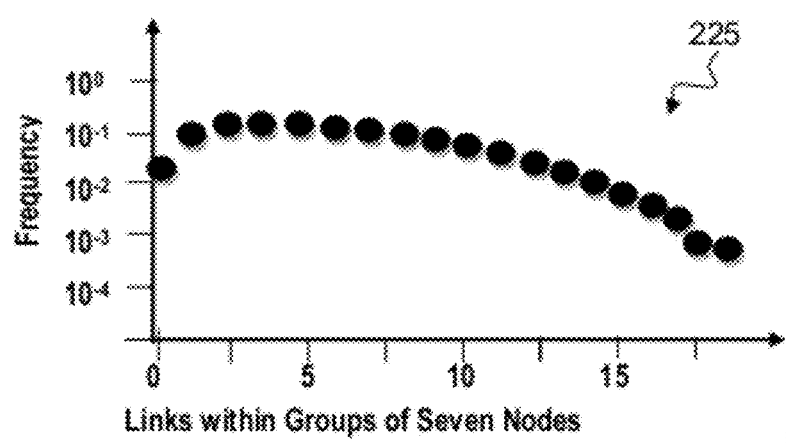
Figure 2F:
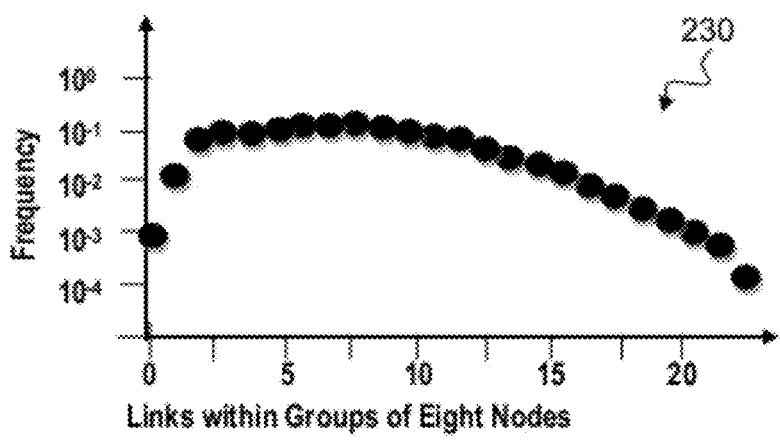

FIG. 1 is a schematic representation of a neural network device 100. Neural network device 100 is a device that mimics the information encoding and other processing capabilities of networks of biological neurons using a system of interconnected nodes. Neural network device 100 can be implemented in hardware, in software, or in combinations thereof.

Neural network device 100 includes a plurality of nodes 105 that are interconnected by a plurality of links 110. Nodes 105 are discrete information processing constructs that are analogous to neurons in biological networks. Nodes 105 generally process one or more input signals received over one or more of links 110 to produce one or more output signals that are output over one or more of links 110. For example, in some implementations, nodes 105 can be artificial neurons that weight and sum multiple input signals, pass the sum through one or more non-linear activation functions, and output one or more output signals.

Nodes 105 in neural network device 100 are organized into a plurality of node assemblies 115, 120, 125, 130. Each node assembly 115, 120, 125, 130 is a collection of nodes. The nodes 105 within each respective node assembly 115, 120, 125, 130 are more likely to establish links 110 with other nodes within the same respective node assembly 115, 120, 125, 130 than with nodes in others of node assemblies 115, 120, 125, 130. For example, in some implementations, the nodes 105 within each node assembly 115, 120, 125, 130 more than 1.5 times as likely, or more than twice as likely, establish links 110 with other nodes within the same respective node assembly 115, 120, 125, 130 than with nodes in others of node assemblies 115, 120, 125, 130.

Different numbers of nodes 105 can be found within different node assemblies 115, 120, 125, 130. For example, in the illustrated implementation, node assemblies 115, 120 each include six nodes 105 whereas node assembly 125 includes seven nodes 105 and node assembly 130 includes four nodes 105. Although node assemblies 115, 120, 125, 130 are shown for the sake of clarity as segregated by discrete two-dimensional boundaries, multi-level interconnected networks of nodes 105 can also be organized into node assemblies. As described further below, node assemblies 115, 120, 125, 130—and the connectivity of nodes 105 to nodes both inside and outside of node assemblies 115, 120, 125, 130—can have one or more features that mimic the features of clusters of biological neurons.

Links 110 are connections between nodes 105 and are analogous to synaptic and other connections between neurons in biological networks. Links 110 can include, e.g., feedforward links, feedback links, recurrent links, or combinations thereof. Links 110 can be unidirectional (e.g., incoming or outgoing) or bidirectional (i.e., reciprocal). Links 110 can be classified according to the relationship between the nodes 105 connected by the links 110. For example, some of links 110, namely, within-assembly links 145, connect nodes 105 that are within a single node assembly 115, 120, 125, 130. Other links 110, namely, between-assembly links 150, connect nodes 105 that are in different of node assemblies 115, 120, 125, 130. Different numbers of within-assembly links 145 can be found within different node assemblies 115, 120, 125, 130. For example, in the illustrated implementation, node assembly 115 includes six within-assembly links 145. Node assembly 120 includes seven within-assembly links 145. Node assembly 125 includes eight within-assembly links 145. Node assembly 130 includes five within-assembly links 145. Thus, even node assemblies that include the same number of nodes 110 (e.g., node assemblies 115, 120) can include different numbers of within-assembly links 145.

Neural network device 100 is hub-free in that neither neural network device 100 nor node assemblies 115, 120, 125, 130 includes hub nodes. Hub nodes are nodes that have a distinguishably larger number of links than other nodes in a network or a network assembly. For example, central nodes in a wheel network (i.e., nodes that have n-1 links in a network in which other nodes all have three links) are examples of hub nodes. Other examples of hub nodes include nodes in a node assembly that have a number of links that lies outside the overall distribution pattern of links per node within that node assembly. The nodes in such a node assembly are thus not constrained to having identically three links but rather can be distributed, e.g., as described further below. In some implementations, nodes in a group of node assemblies (such as, e.g., all of the nodes in neural network device 100) can all have the same hierarchy.

Each of links 110 can have an associated weight that characterizes the strength of the connection between linked nodes 105. The weights are analogous to the strength of synaptic and other connections between neurons in biological networks.

As described further below, in some implementations, within-assembly links 145 in a single node assembly 115, 120, 125, 130 can have weights that embody the number of nodes 105 and/or the number of within-assembly links 145 inside the node assembly. In some implementations, the magnitudes of the weights of the within-assembly links 145 can have a relatively low variance. The variance can be low enough that—for at least some numbers of within-assembly links 145 in node assemblies 115, 120, 125, 130 that have a given number of nodes 105—the magnitudes of the within-assembly link weights in node assemblies that have relatively small numbers of within-assembly links 145 associated with one level of a set of distinguishable discrete levels.

As neural network device 100 is trained, the weights adapt to produce a desired signal flow and achieve the desired information processing or information storage results. In some implementations, the magnitudes of the within-assembly link weights can be relatively independent of any training of neural network device 100. In some implementations, training is embodied primarily or even exclusively in the weights of between-assembly links 150.

FIGS. 2-12 are presentations of illustrative examples of features that both trained and untrained neural network devices can be organized to have. One or more of these features can facilitate information processing and/or storage. For example, FIGS. 2A-2F are graphs that present illustrative examples of frequencies at which different numbers of links can appear within groups of different numbers of nodes in implementations of either trained or untrained neural network devices having twelve nodes. In particular, FIG. 2A is a graph 205 that presents illustrative examples of the frequencies at which between zero and six links appear in groups of three nodes. FIG. 2B is a graph 210 that presents illustrative examples of the frequencies at which between zero and nine links appear in groups of four nodes. FIG. 2C is a graph 215 that presents illustrative examples of the frequencies at which between zero and eleven links appear in groups of five nodes. FIG. 2D is a graph 220 that presents illustrative examples of the frequencies at which between zero and fifteen links appear in groups of six nodes. FIG. 2E is a graph 225 that presents illustrative examples of the frequencies at which between zero and nineteen links appear in groups of seven nodes. FIG. 2F is a graph 230 that presents illustrative examples of the frequencies at which between zero and twenty two links appear in groups of eight nodes.

The groups of nodes in FIGS. 2A-2F are not necessarily nodes that form a node assembly. Rather, these groups can possibly represent possible random groupings of nodes within a neural network device. Thus, it is possible that some such groups of nodes have zero links between the nodes in the group.

For groups with more than three nodes, the frequency at which one link appears within a group is higher than the frequency at which zero links appear within a group. Further, for groups with four or more nodes, the frequency at which the number of links that appear within a group is the same as the number of nodes within a group is approximately $10^{-1}$. For these groups with four or more nodes, the frequencies at which numbers of links that appear within groups that exceed the number of nodes within those groups are lower than approximately $10^{-1}$.

The frequencies at which links appear within these groups in FIG. 2A-2F differs from the frequencies at which one would expect the links to appear were connections randomly assigned. FIGS. 3A-3F are graphs that present illustrative examples of such differences, i.e., the differences between the frequencies at which links can appear within the groups in FIG. 2A-2F and the frequencies at which one would expect the links to appear were connections randomly assigned. In these and the other illustrative examples found in this application, the overall connection probability was 0.15. Trained and untrained neural network devices can be organized to have corresponding features at other overall connection probabilities.

These differences in FIG. 2A-2F are presented in terms of a normalized parameter that embodies the presence of links in excess of expectations (i.e., in positive values of the parameter), as well as the absence of expected links (i.e., in negative values of the parameter). In the illustrated implementation, this normalized parameter is derived by computing a difference between the actual frequency at which links appear within a particular group and the frequency at which one would expect the links to appear were connections randomly assigned. The computed difference is then normalized by the frequency at which one would expect the links to appear were connections randomly assigned.

Figure 3A:
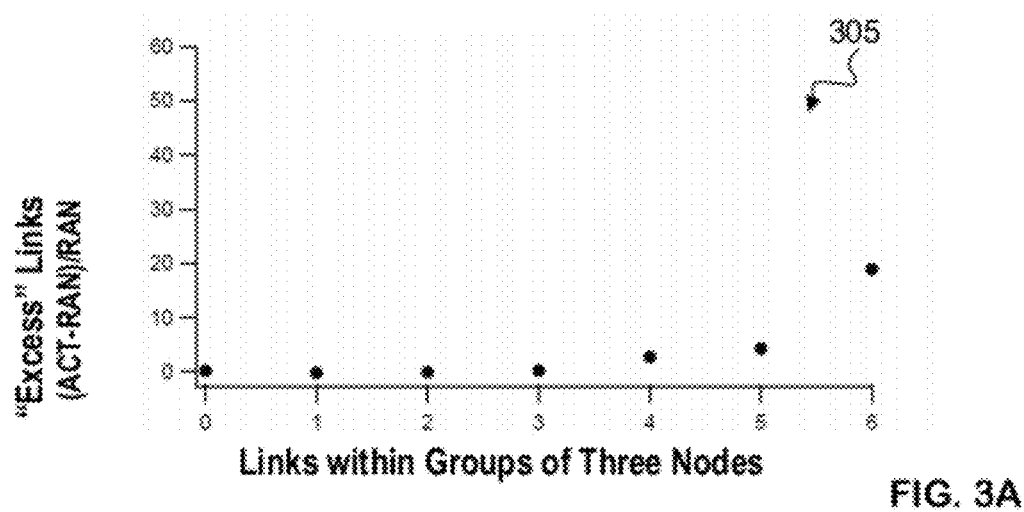
FIGS. 3A-3F are graphs that present illustrative examples of the differences between the frequencies at which links can appear within the groups in FIG. 2A-2F and the frequencies at which one would expect the links to appear were connections randomly assigned.
Figure 3B:
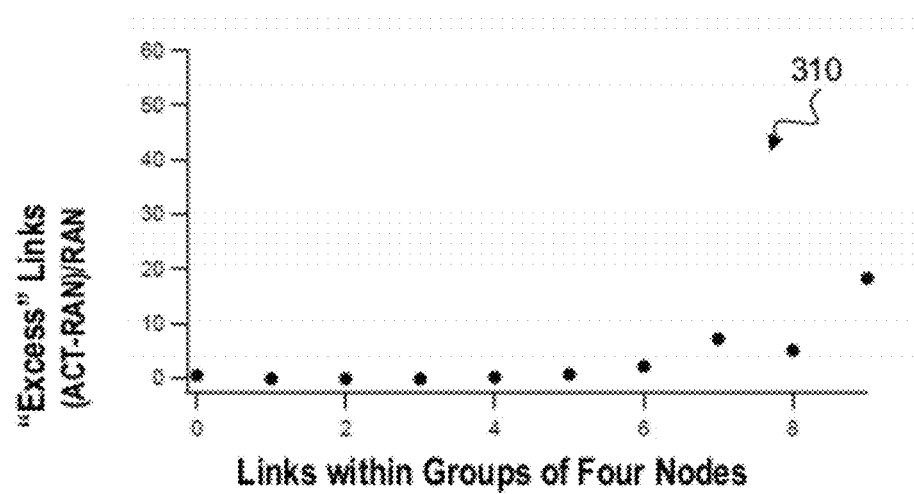
Figure 3C:
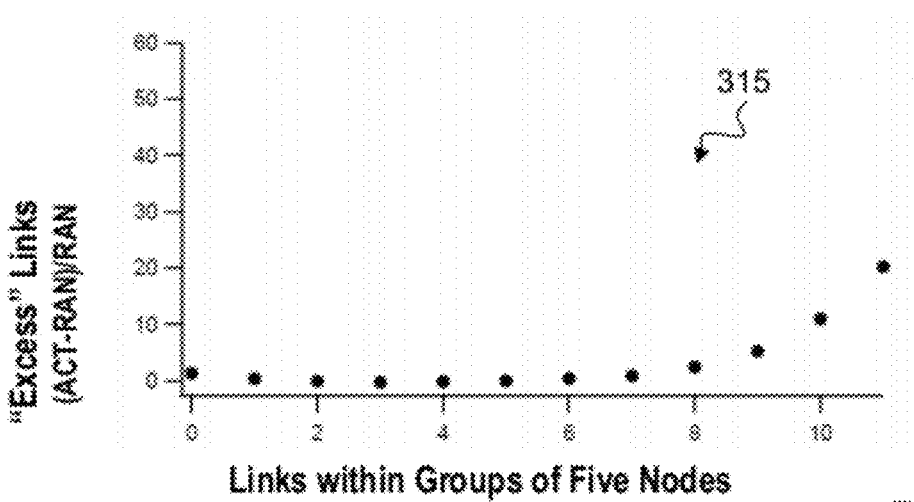
Figure 3D:
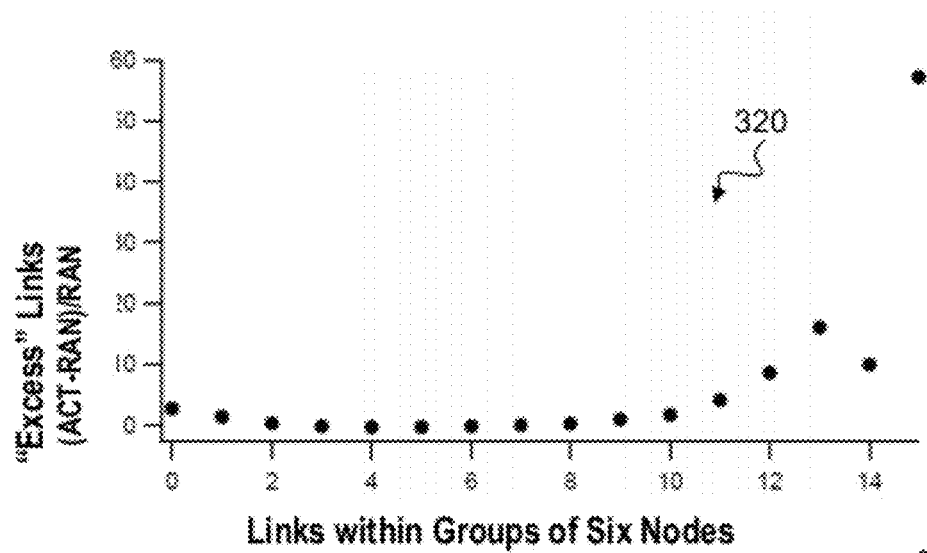
Figure 3E:
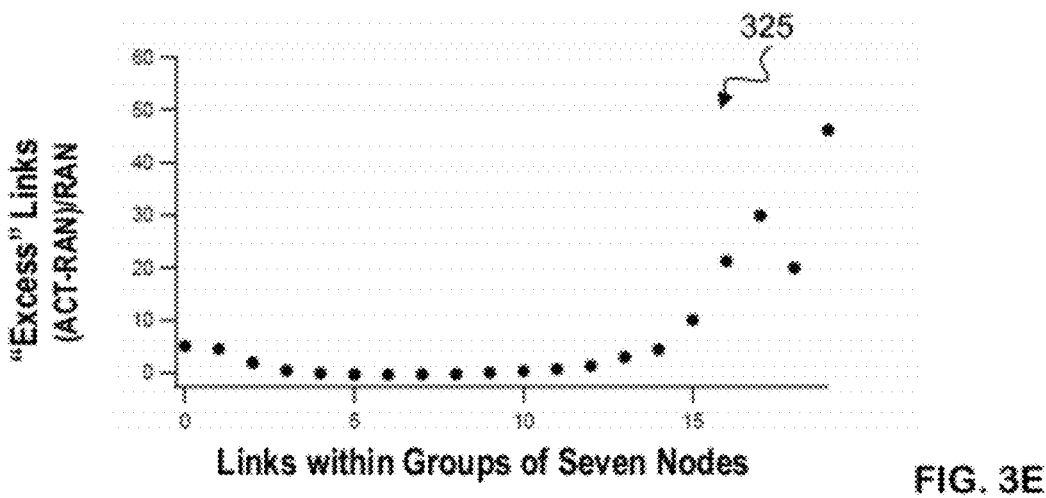

In particular, FIG. 3A is a graph 305 that presents illustrative examples of the deviations from expectations in frequencies of appearance of between zero and six links in groups of three nodes. FIG. 3B is a graph 310 that presents illustrative examples of the deviations from expectations in frequencies of appearance of between zero and nine links in groups of four nodes. FIG. 3C is a graph 315 that presents illustrative examples of the deviations from expectations in frequencies of appearance of between zero and eleven links in groups of five nodes. FIG. 3D is a graph 320 that presents illustrative examples of the deviations from expectations in frequencies of appearance of between zero and fifteen links in groups of six nodes. FIG. 3E is a graph 325 that presents illustrative examples of illustrative examples of the deviations from expectations in frequencies of appearance of between zero and nineteen links in groups of seven nodes.

Figure 3F:
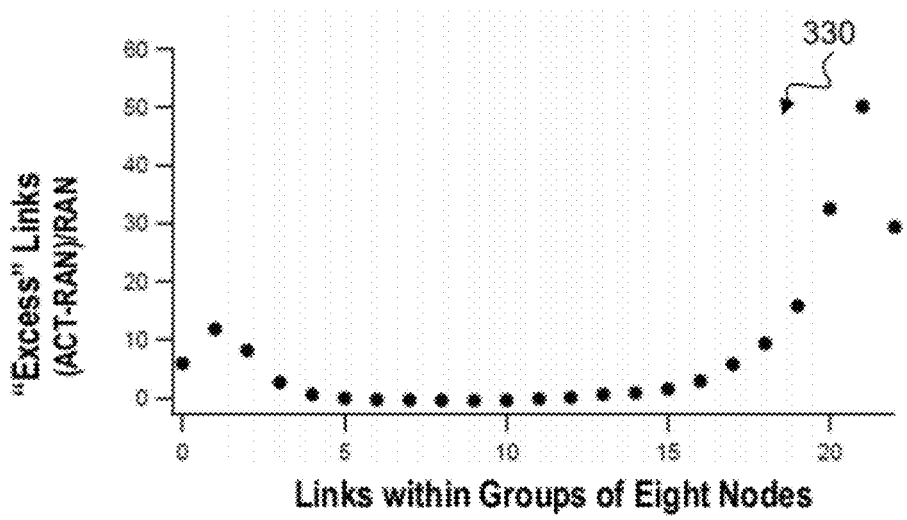

FIG. 3F is a graph 330 that presents illustrative examples of the deviations from expectations in frequencies of appearance of between zero and twenty two links in groups of eight nodes. The groups of nodes in FIGS. 3A-3F are not necessarily nodes that form a node assembly. Rather these groups of nodes represent possible random groupings of nodes within a neural network device.

For groups of all sizes, relatively larger numbers of links are more frequent within random groupings of nodes than would be expected were connections randomly assigned. These deviations from expectations generally become significant at numbers of links that exceed the numbers of nodes within the random grouping. For example, graph 310 shows that random groupings of four nodes are more likely to have five or more links than would be expected were connections randomly assigned. As another example, graph 315 shows that random groupings of five nodes are more likely to have six or more links than would be expected were connections randomly assigned. As yet another example, graph 320 shows that random groupings of six nodes are more likely to have seven or more links than would be expected were connections randomly assigned.

For example, in groups of six or more nodes, intermediate numbers of links are less frequent within random groupings of nodes than would be expected were connections randomly assigned. These deviations from expectations generally are significant at numbers of links that are less than the number of nodes within the random grouping but greater than or equal to about one half the numbers of nodes within the random grouping. For example, graph 320 shows that random groupings of six nodes are less likely to have three, four, or five links than would be expected were connections randomly assigned. As another example, graph 325 shows that random groupings of seven nodes are less likely to have four, five, or six links than would be expected were connections randomly assigned. As yet another example, graph 330 shows that random groupings of eight nodes are less likely to have four, five, six, or seven (also eight or nine) links than would be expected were connections randomly assigned.

Figure 4A:
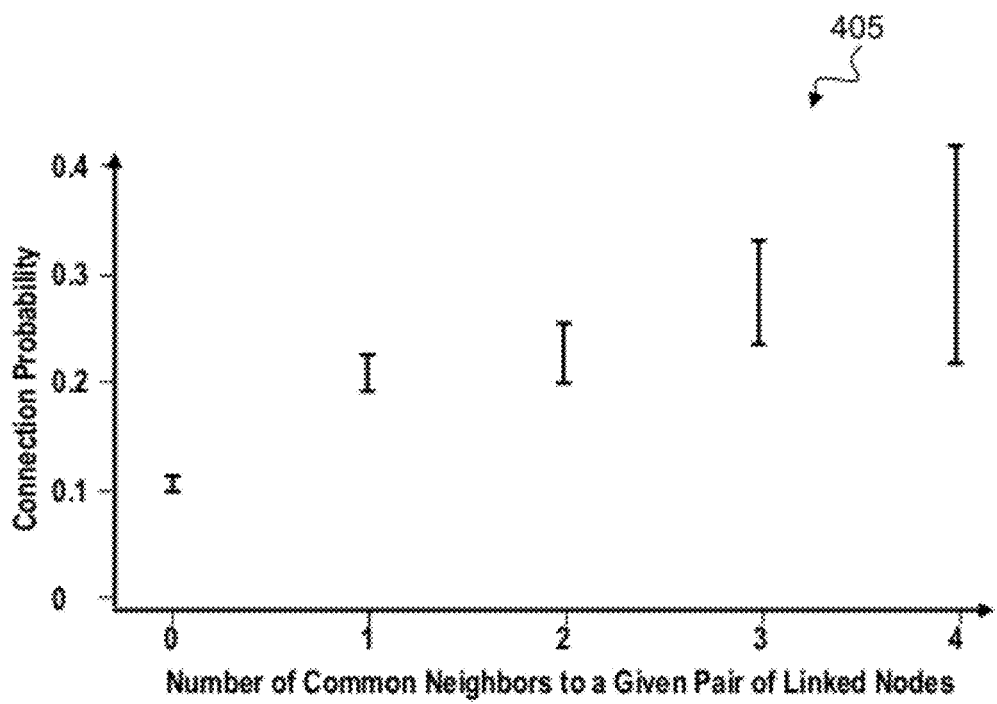
FIGS. 4A, 4B are graphs that present illustrative examples of different probabilities that embody the likelihood that a given pair of nodes that shares different numbers of common neighbors are themselves linked.
Figure 4B:
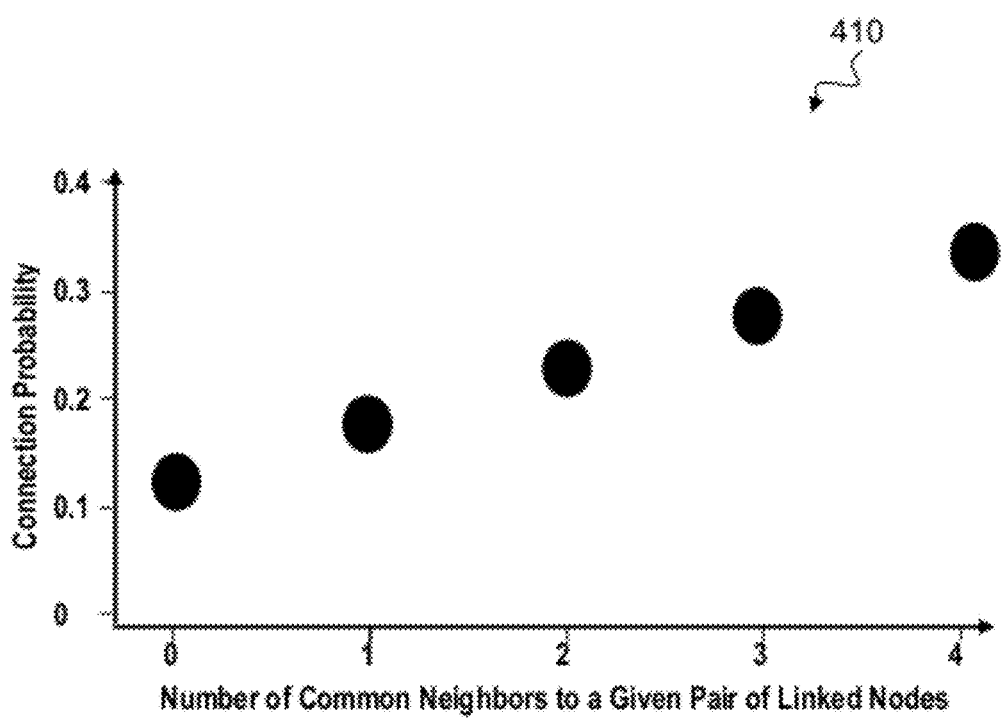

Another way that the connectivity of nodes in implementations of neural network devices can have one or more features that mimic the features of clusters of biological neurons is in the probability that any two nodes that share common neighbors are themselves linked. FIGS. 4A, 4B are graphs that present illustrative examples of different probabilities that embody the likelihood that a given pair of nodes that shares different numbers of common neighbors are themselves linked in implementations of either trained or untrained neural network devices. A common neighbor is a third node that is linked to each of a pair of nodes.

In FIG. 4A, a graph 405 presents one illustrative set of example probabilities that a given pair of nodes in a neural network device which share zero, one, two, three, and four common neighbors are themselves linked in implementations of neural network devices having 12 nodes. As shown, with increasing numbers of common neighbors shared by a pair of nodes, the probability that the pair of nodes are themselves linked increases. The likelihood of a connection between a pair of nodes is thus positively correlated with the number of common neighbors shared by the nodes in the pair. By way of comparison, if the probability that a pair of nodes were linked were independent of the number of common neighbors shared by the pair, then the connection probability would not increase but rather remain constant with the number of common neighbors shared by the nodes in the pair.

In FIG. 4B, a graph 410 presents an illustrative example of a linearly increasing set of probabilities that a given pair of nodes which share zero, one, two, three, and four common neighbors are themselves linked in implementations of neural network devices having 12 nodes. As shown, with increasing numbers of common neighbors shared by a pair of nodes, the probability that the pair of nodes are themselves linked increases linearly. The likelihood of a connection between a pair of nodes is thus positively correlated with the number of common neighbors shared by the nodes in the pair. For example, a pair of nodes that shares four common neighbors is almost three times as likely to be connected than a pair of nodes that does not share any common neighbors.

Although graphs 405, 410 present illustrative probabilities that pairs of nodes which share common neighbors are themselves linked in neural network devices having 12 nodes, corresponding properties can be embodied in neural network devices of other sizes.

In some implementations of either trained or untrained neural network devices, the probability that nodes are connected also embodies the type of links with the common neighbors. For example, in some implementations, pairs of nodes that receive input from a same common neighbor are more likely to be connected than pairs of nodes that output to a same common neighbor are to be connected.

In some implementations, not only does the probability that any two nodes are themselves linked embody the number of common neighbors, but also the strength of the interconnection (i.e., the weights of links) between those two nodes embodies the number of shared common neighbors. In particular, the strength of the interconnection between two nodes increases as the number of shared common neighbors increases.

An increased likelihood that a given pair of nodes which share common neighbors are themselves linked can be used to form trained and untrained neural network devices that include node assemblies in which the nodes within a particular node assembly are more likely to be linked with other nodes within that same assembly than with nodes in other node assemblies. Examples of such node assemblies are node assemblies 115, 120, 125, 130 (FIG. 1). In particular, links can be formed in even an untrained neural network device according to the probability that a link between the nodes exists.

A variety of different approaches can be used to form such neural network devices. For example, in some implementations, an initial set of links can be assigned to a set of nodes according to any of a variety of different processes, including random assignment processes and processes in which link assignments are made in accordance with a probability space that mimics, e.g., a distance-dependent probability of two biological neurons being linked. After assignment of such an initial set of links, a link reassignment process can be used to reorganize the neural network until the network embodies the desired link probabilities or other characteristics. For example, the link reassignment can include an iterative process that removes links between nodes and then reassigns the removed links to new nodes according to a probability that embodies the number of shared common neighbors and/or the type of links with those common neighbors. The link reassignment process can thus be used to organize a neural network device to have desired characteristics even before training has begun.

In other embodiments, the assignment of an initial set of links also embodies the desired link probabilities or other characteristics. In other words, all link assignments can embody the desired characteristics. In such implementations, the initial assignments of links to a set of nodes may not noticeably impact link assignments since links are sparse are the probabilities that different links exist are approximately equal. However, as link density increases and nodes begin to share common neighbors, the probabilities that nodes which have common neighbors are themselves linked increases. As more link assignments are made, nodes will tend to become grouped into node assemblies in which nodes are more likely to be linked to other nodes within one node assembly than with nodes in other node assemblies.

In some implementations, such a link assignment process can include an iterative process that removes links between nodes and then reassigns the links to new nodes according to the probability that a link exists between the new nodes. Such a reassignment process can be used to organize even untrained neural network devices. In other words, node assemblies can thus be formed prior to training and link assignments (with or without link reassignments) can be made before a neural network device is trained. With pre-existing node assemblies, neural network device training can yield neural networks devices that achieve desired information processing or information storage results with neural networks—and node assemblies in the neural networks—that are organized in accordance with the pre-existence of the node assemblies.

In some implementations, such link assignments (with or without link reassignments) can be made as a neural network device is trained. For example, training can be started in a neural network device. As training progresses, links that are not very important to the information processing or information storage for which the neural network device is being trained (i.e., links with low weights) can be preferentially removed and reassigned to new nodes according to the probability that a link exists between the new nodes. At times, the reassigned links may be important to the information processing or information storage for which the neural network device is being trained and the neural network device will require extra training to adapt to the reassignment. Indeed, links that formerly were relevant to the information processing or information storage for which the neural network device is being trained may become less relevant and can be reassigned accordingly. In this, the neural network device can mimic biological plasticity as the neural network device reorganizes over time.

The assignment and/or reassignment processes can be implemented to achieve neural network devices having the desired characteristics by an adaptor component implemented in hardware, in software, or in combinations thereof. For example, in some implementations, such an adaptor component can be part of a computer system that assigns and/or changes weights in an untrained neural network device. In other implementations, such an adaptor component can be work in conjunction with or be part of a neural network devices trainer that trains the neural network to produce a desired signal flow.

Figure 5A:
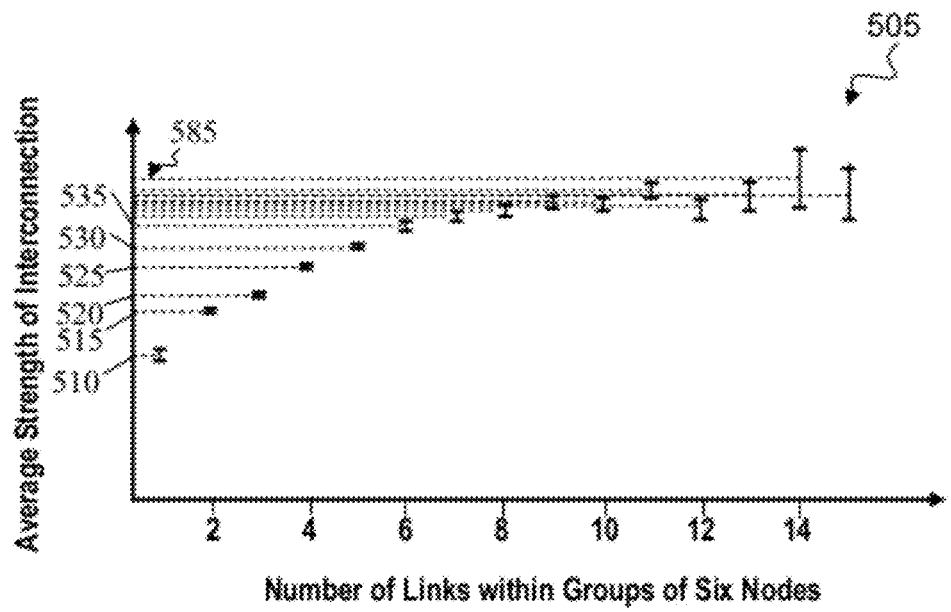
FIGS. 5A, 5B are graphs that presents illustrative examples of different average strengths of interconnection between nodes within groups or assemblies of six nodes.
Figure 5B:
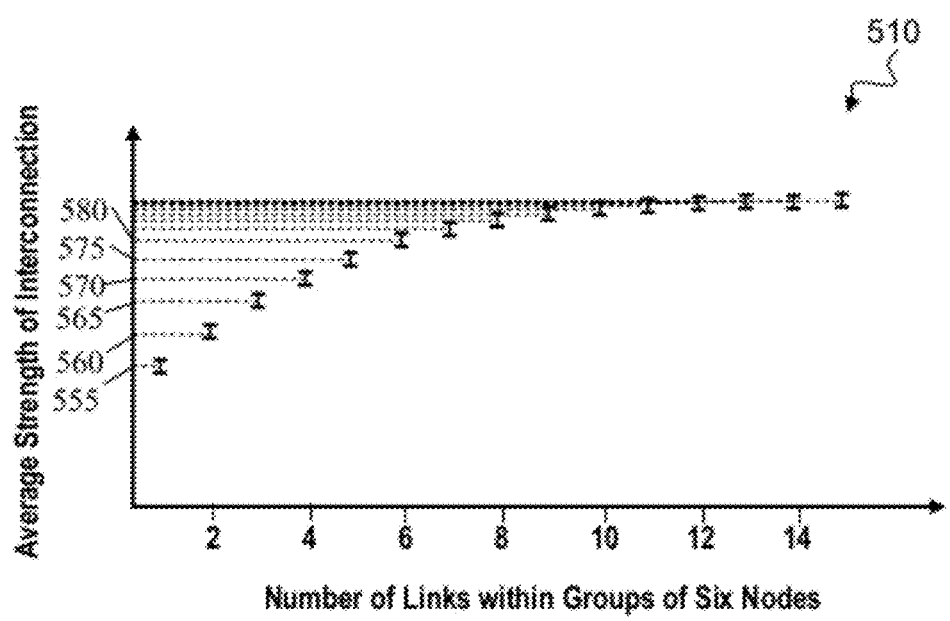

Another way that the connectivity of nodes in implementations of neural network devices can have one or more features that mimic the features of clusters of biological neurons is in the strengths of the interconnections (i.e., the weights of links) between nodes. FIGS. 5A, 5B are graphs that presents illustrative examples of different average strengths of interconnection between nodes within groups or assemblies of six nodes in implementations of either trained or untrained neural network devices having 12 nodes. The groups of nodes are not necessarily nodes that form a single node assembly. Rather, these groups of nodes are possible random groupings of the nodes within a neural network device. However, since the number of nodes in the neural network device is relatively modest (i.e., 12 nodes), there is a relatively high likelihood that the randomly selected nodes are in fact part of a single node assembly. The properties of these groups of nodes thus can be extrapolated to node assemblies.

Such strengths of interconnection can be assigned and/or changed by adaptor component implemented in hardware, in software, or in combinations thereof. For example, in some implementations, such an adaptor component can be part of a computer system that assigns and/or changes weights in an untrained neural network device. In other implementations, such an adaptor component can be work in conjunction with or be part of a neural network devices trainer that trains the neural network to produce a desired signal flow.

In graph 505 of FIG. 5A, the weights that present illustrative examples of the strength of interconnection between nodes within a group or assembly increase as the number of links within the group or assembly increases at least for numbers of links that are less than or equal to the number of nodes within a group or assembly. In particular, in the illustrative graphical representation, the average strength of interconnection increases at least for groups or assemblies of six nodes (in neural network devices having 12 nodes) having six or fewer links as the number of links increases. Further, the weights that present illustrative examples of the strength of interconnection between nodes within a group or assembly tend to become indistinguishable as the number of links within the group or assembly increases beyond the number of nodes within that group or assembly. In particular, in the illustrative graphical representation, the average strength of interconnection tends to be indistinguishable for groups or assemblies of six nodes (in neural network devices having 12 nodes) having seven or more links.

Further, the magnitudes of the strengths of interconnection are associated with distinguishably discrete levels for numbers of links that are less than or equal to the number of nodes within a group or assembly. In particular, groups or assemblies of six nodes that have one link have an average strength of interconnection 510. Groups or assemblies of six nodes that have two links have an average strength of interconnection 515. Groups or assemblies of six nodes that have three links have an average strength of interconnection 520. Groups or assemblies of six nodes that have four links have an average strength of interconnection 525. Groups or assemblies of six nodes that have five links have an average strength of interconnection 530. Groups or assemblies of six nodes that have six links have an average strength of interconnection 535. The average strength of interconnection 585 may become indistinguishable for groups or assemblies of six nodes that have seven or more links.

In graph 550 of FIG. 5B, the weights that present illustrative examples of the strength of interconnection between nodes within a node assembly in some implementations of neural network devices increase as the number of links within the group or assembly increases. In particular, the average strength of interconnection increases non-linearly with the magnitude of the increase in strength of interconnection per additional link decreasing as the number of links within the group or assembly increases. In the illustrative examples presented, the average strength of interconnection asymptotically approaches a limit as the number of links within the group or assembly exceeds the number of nodes within the group or assembly. In some implementations, this limit on the average strength of interconnection mimics saturation levels that represent the strongest interconnections between biological neurons. For example, the limit on average strength of interconnection can be independent of the number of nodes within a group or assembly and be substantially identical for groups or assemblies of different sizes.

Further, the magnitudes of the strengths of interconnection of the links are associated with distinguishably discrete levels for at least some numbers of links. For example, groups or assemblies of six nodes that have one link have an average strength of interconnection 555. Groups or assemblies of six nodes that have two links have an average strength of interconnection 560. Groups or assemblies of six nodes that have three links have an average strength of interconnection 565. Groups or assemblies of six nodes that have four links have an average strength of interconnection 570. Groups or assemblies of six nodes that have five links have an average strength of interconnection 575. Groups or assemblies of six nodes that have six links have an average strength of interconnection 580. The average strength of interconnection continues to increase until groups or assemblies of six nodes that have twelve or more links.

Although graphs 505, 550 only present illustrative examples for groups or assemblies having six nodes in neural network devices having 12 nodes, average strengths of interconnection between nodes within groups or assemblies of other sizes may have comparable properties that can be embodied in neural network devices of other sizes.

With the average strengths of interconnection between nodes within groups or assemblies of nodes embodying the number of links within those groups or assemblies, the weights of links within a group or node assembly do not necessarily embody the training of the neural network device. In this regard, as described above, weights adapt during training to produce a desired signal flow and achieve the desired information processing or information storage results. Highly interconnected groups or assemblies (e.g., groups in which the number of links within the group or assembly exceeds the number of nodes within the group or assembly) are likely to be groups or node assemblies in which nodes are more likely to be connected to other nodes within the group or node assembly than to nodes in other groups or node assemblies. However, with the weights of highly connected groups or assemblies of nodes becoming indistinguishable and possibly even asymptotically approaching a limit, the weights that embody particularized training are embodied primarily or even exclusively in the weights of links between nodes in different groups or assemblies.

Given that, in some implementations,
the average strengths of interconnection within groups of nodes of a trained or untrained neural network device embody the number of links within each group, and
the probabilities that any pair of nodes are connected embody the number of common neighbors shared by those nodes,
the average strengths of interconnection between pairs of nodes can also embody the number of common neighbors shared by those nodes. In this regard, when a randomly-selected group of nodes includes a pair of nodes that has a number of common neighbors, then the probability that that the pair of nodes is connected is higher. Such a randomly-selected group of nodes (i.e., a group with a pair of nodes that has a number of common neighbors) is thus likely to have more links than a group of nodes with a pair of nodes that has fewer common neighbors. Since the average strength of interconnection increases as the number of links within a group increases, a randomly selected group that includes a pair of nodes that has a higher number of common neighbors is likely to have a higher average strength of interconnection.

In some implementations, nodes in trained or untrained neural network devices can have average strengths of interconnection that embody the number of common neighbors shared by those nodes in the group or assembly. Such strengths of interconnection can be assigned and/or changed by adaptor component implemented in hardware, in software, or in combinations thereof. For example, in some implementations, such an adaptor component can be part of a computer system that assigns and/or changes weights in an untrained neural network device. In other implementations, such an adaptor component can be work in conjunction with or be part of a neural network devices trainer that trains the neural network to produce a desired signal flow.

Figure 6:
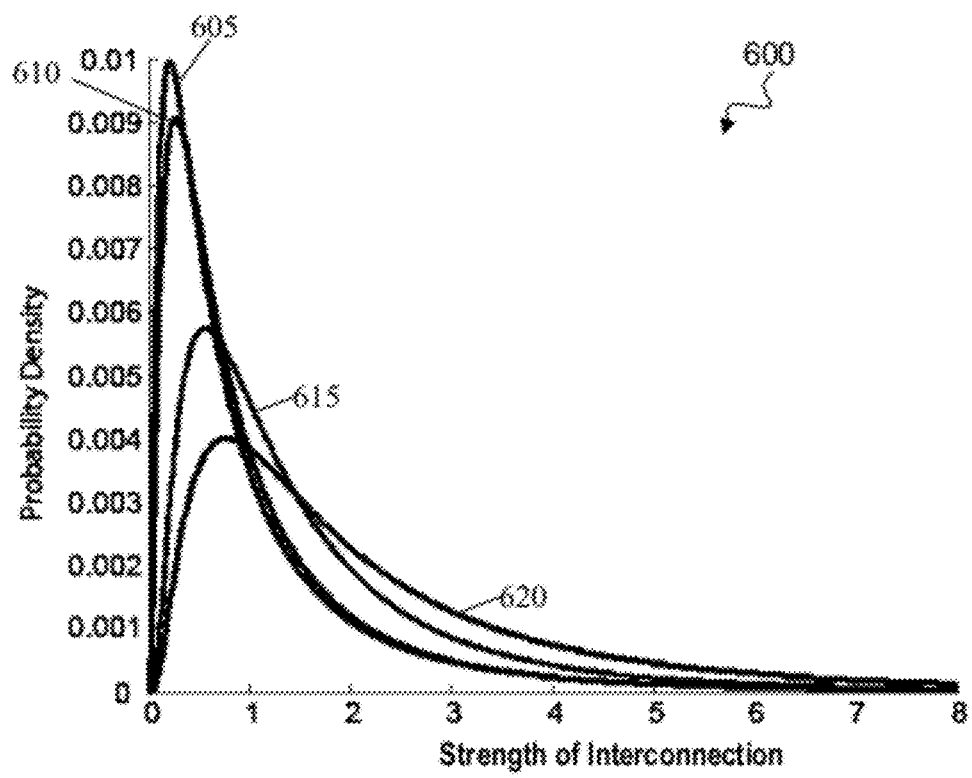
FIG. 6 is a graph that presents illustrative examples of different probability density distributions of strengths of interconnection between nodes having different numbers of interconnections.

FIG. 6 is a graph 600 that presents illustrative examples of different probability density distributions of strengths of interconnection between nodes having different numbers of interconnections in implementations of either trained or untrained neural network devices having 12 nodes. In particular, a plot 605 presents illustrative examples of probabilities that a link between nodes having zero common neighbors has particular strengths of interconnections. A plot 610 presents illustrative examples of probabilities that a link between nodes having one common neighbors has particular strengths of interconnections. A plot 615 presents illustrative examples of probabilities that links between nodes having two common neighbors have particular strengths of interconnections. A plot 620 presents illustrative examples of probabilities that a link between nodes having three common neighbors has particular strengths of interconnections.

As shown, as the number of common neighbors increases, the average strength of interconnection between nodes increases. Further, the illustrative probability distributions presented by plots 605, 610, 615, 620 are positively skewed. In some implementations, positive skewness increases as the number of common neighbors increases (as shown).

Although graph 600 presents illustrative probability density distributions of strengths of interconnection in neural network devices having 12 nodes, corresponding properties can be embodied in neural network devices of other sizes.

In some implementations of neural network devices, the variance of the strength of interconnection tends to decrease as the number of links within a randomly selected group or an assembly of nodes increases.

Figure 7A:
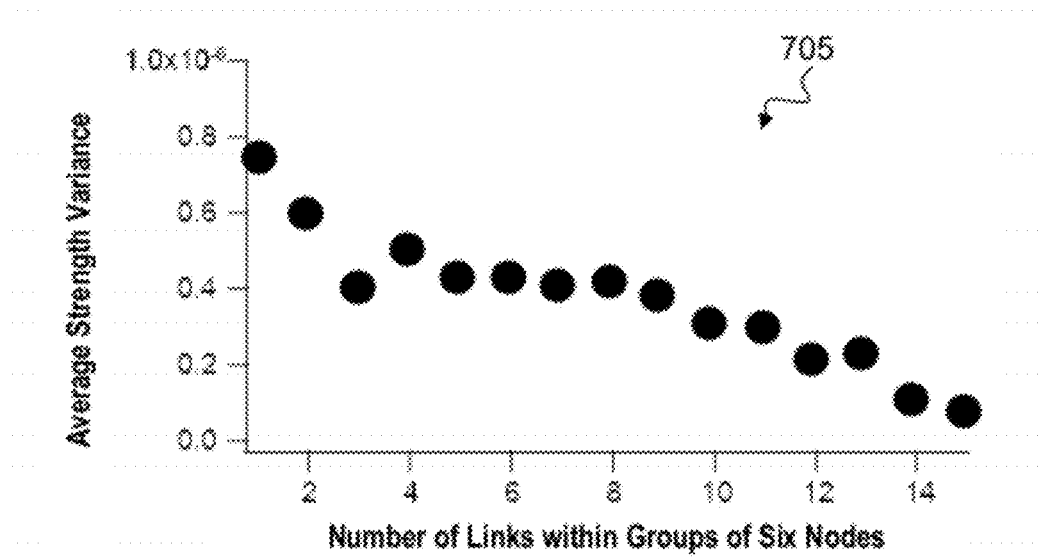
FIGS. 7A, 7B are graphs that present illustrative examples of different variances of the average strength of interconnections between nodes within groups or assemblies of six nodes.
Figure 7B:
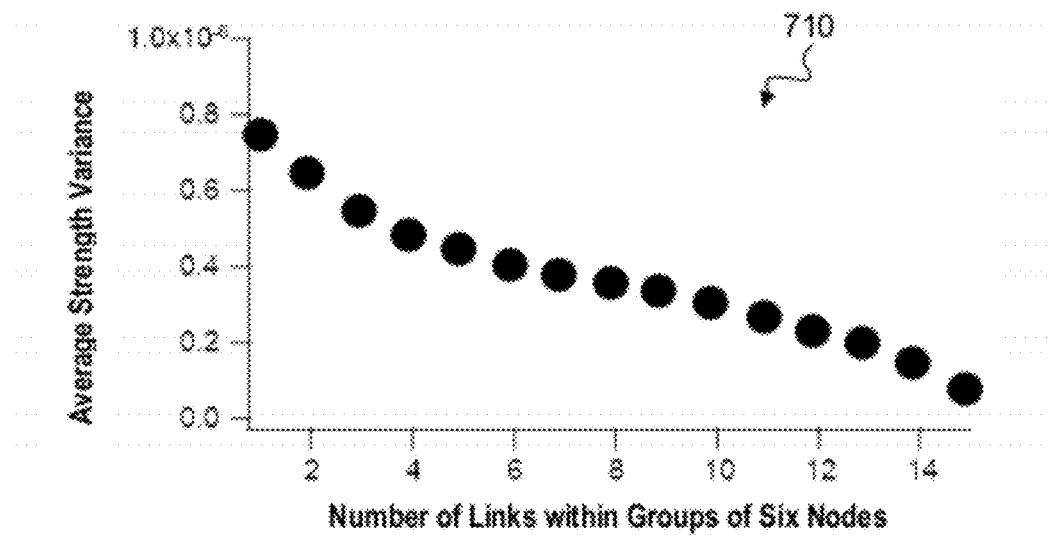

FIGS. 7A, 7B are graphs that present illustrative examples of different variances of the average strength of interconnections between nodes within groups or assemblies of six nodes in implementations of either trained or untrained neural network devices. The groups of nodes are not necessarily nodes that form a single node assembly. Rather, these groups of nodes are possible random groupings of the nodes within a neural network device. However, since the number of nodes in the neural network device is relatively modest (i.e., 12 nodes), there is a relatively high likelihood that the randomly selected nodes are in fact part of a single node assembly. The properties of these groups of nodes thus can be extrapolated to node assemblies.

Such variances of the average strength of interconnections can be achieved by an adaptor component implemented in hardware, in software, or in combinations thereof. For example, in some implementations, such an adaptor component can be part of a computer system that assigns and/or changes weights in an untrained neural network device. In other implementations, such an adaptor component can be work in conjunction with or be part of a neural network devices trainer that trains the neural network to produce a desired signal flow.

In graph 705 of FIG. 7A, the variances of the weights that represent the strength of interconnection tend to decrease as the number of links within various groups or assemblies of six nodes increases. In other words, the average strength of interconnection tends to become more uniform as the number of links within the various groups or assemblies increases. In the illustrative graphical representation, the decrease in variance is not smooth. For example, the variance of the average strength of interconnection for groups or assemblies of six nodes that have four links is higher than the variance of the average strength of interconnection for groups or assemblies of six nodes that have three links.

In graph 710 of FIG. 7B, the variances of the weights that represent the strength of interconnection also decreases as the number of links within various groups or assemblies of six nodes increases. In the illustrative graphical representation, the decrease in variance is smooth. In the illustrative representation, the rate of decrease per additional link is highest for groups or assemblies having numbers of links that are one half or less than the number of nodes (i.e., groups or assemblies having three or fewer links for the illustrative groups or assemblies of six nodes). The rate of decrease per additional link decreases for groups or assemblies having numbers of links that are approximately the same as the number of nodes, and the rate of decrease per additional link increases for groups or assemblies having numbers of links that are two or more times the number of nodes. In other implementations, the rate of decrease per additional link is constant.

Although graphs 705, 710 only illustrate groups or assemblies having six nodes, variances of the average strength of interconnections between nodes within a groups or assemblies of other sizes may have comparable properties.

As described previously, in some implementations of trained and untrained neural network devices, the nodes within a node assembly are more likely to be linked with other nodes within that node assembly than with nodes in other node assemblies. For example, in some implementations, the nodes within a node assembly are more than 1.5 times as likely, or more than twice as likely, to be linked with other nodes within that node assembly than with nodes in other node assemblies.

Figure 8:
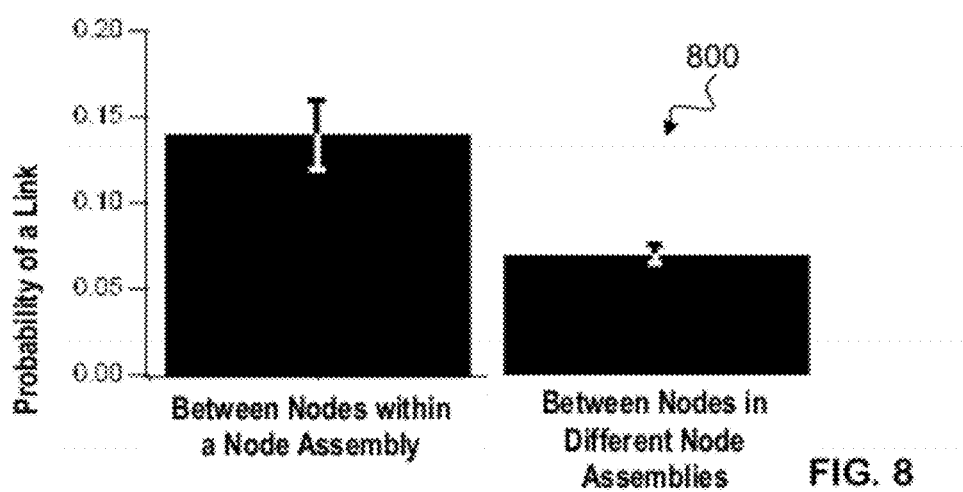
FIG. 8 is a graph that presents illustrative examples of probabilities that a pair of nodes within a node assembly and a pair of nodes in a two different node assemblies are linked.

FIG. 8 is a graph 800 that presents illustrative examples of probabilities that a pair of nodes within a node assembly and a pair of nodes in a two different node assemblies are linked. In the illustrative implementation shown, nodes within a single node assembly are approximately twice as likely to be linked than with nodes in different node assemblies. In particular, the mean connection probability for pairs of nodes within a single node assembly is 0.14±0.02, which is approximately twice the probability for pairs of nodes belonging to different node assemblies 0.07±0.005.

In some implementations of trained or untrained neural network devices, the average number of nodes within a node assembly is between 10 and 100 nodes. In some implementations, a trained or untrained neural network device can include between 10 and 100 of such node assembly units.

Figure 9A:
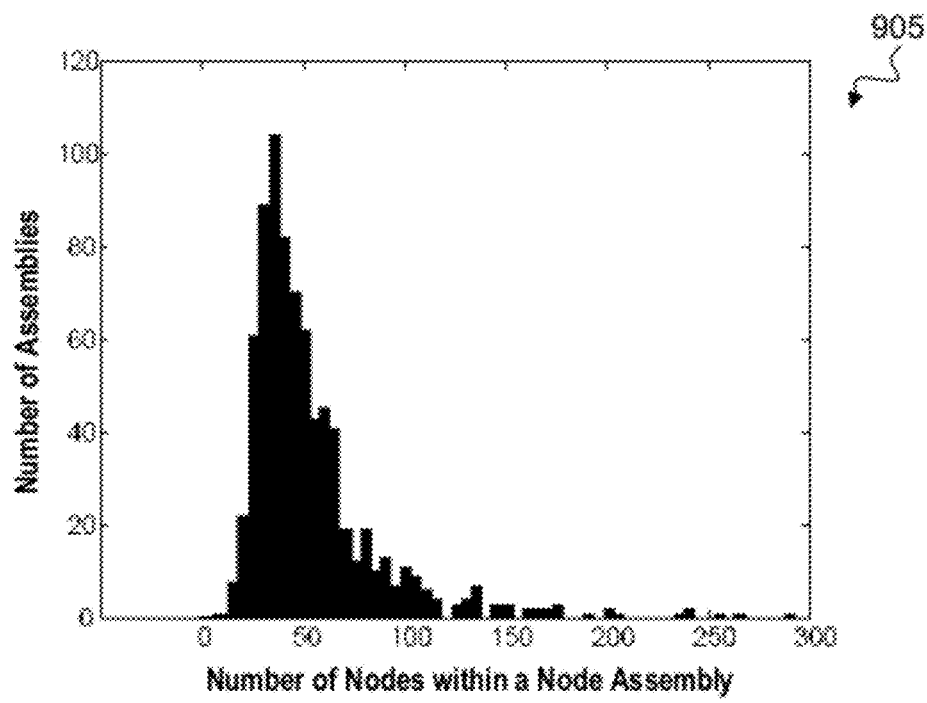
FIGS. 9A, 9B are graphs that present illustrative examples of different distributions of node assembly sizes in trained or untrained neural network devices.
Figure 9B:
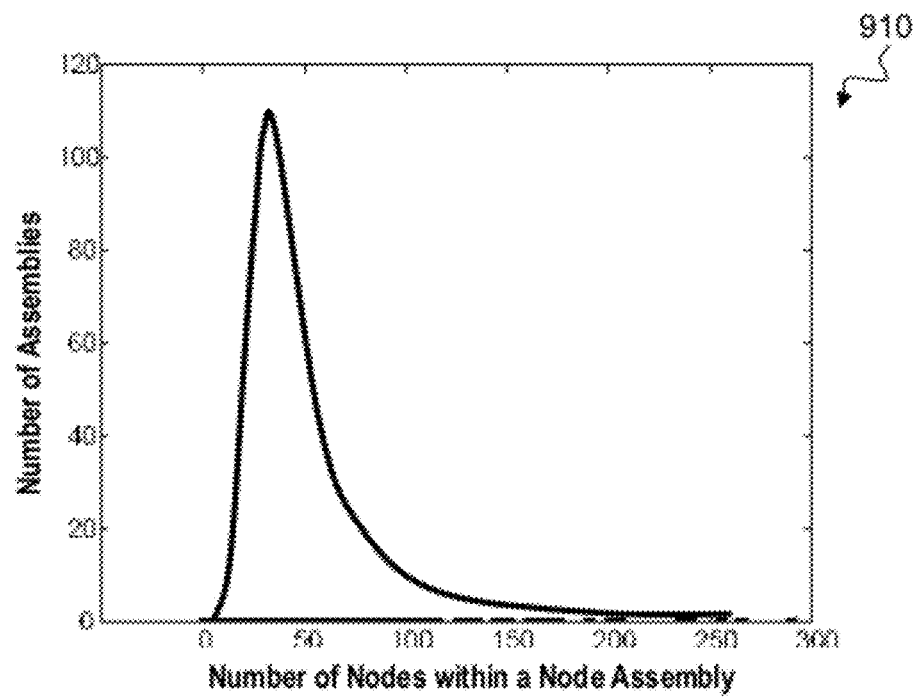

FIGS. 9A, 9B are graphs that present illustrative examples of different distributions of node assembly sizes in trained or untrained neural network devices.

In graph 905 of FIG. 9A, the number of node assemblies that have between ten and 100 nodes is larger than the number of assemblies that have less than ten and more than 100 nodes. Indeed, the node assemblies that have more than 100 nodes may, in some implementations, be formed by discrete node assemblies that share enough links to interconnect and become assemblies of assemblies. Further, the illustrative distribution of node assemblies is positively skewed.

In graph 910 of FIG. 9B, the number of node assemblies that have between ten and 100 nodes is larger than the number of assemblies that have less than ten and more than 100 nodes. In the illustrative distribution, the node assembly sizes varies smoothly and reaches a maximum between 20 and 30 nodes per assembly. The node assemblies that have more than 100 nodes may, in some implementations, be formed by discrete node assemblies that share enough links to interconnect and become assemblies of assemblies. Further, the illustrative distribution of node assemblies is positively skewed.

In some implementations of trained and untrained neural network devices in which nodes within a node assembly are more likely to be linked than nodes in different node assemblies, a clustering coefficient of the neural network devices is higher. A clustering coefficient is a measure of degree to which nodes in the neural network devices tend to cluster together. As used herein, the clustering coefficients for a vertex is the proportion of links between the vertices within its neighborhood divided by the number of links that could possibly exist between them (i.e., the so-called "local clustering coefficient" or "Strogatz clustering coefficient").

Figure 10:
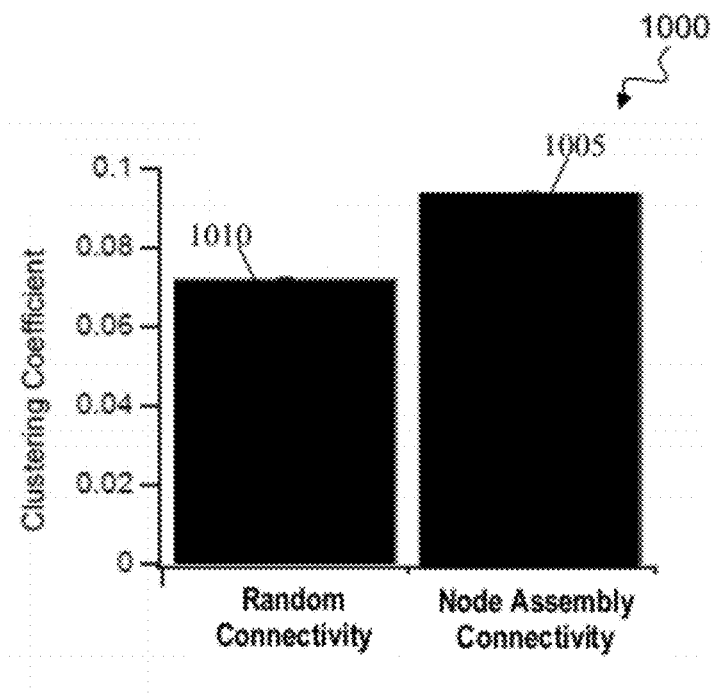
FIG. 10 is a graph that presents illustrative examples of a clustering coefficient for neural network devices that include node assembly connectivity.

FIG. 10 is a graph 1000 that presents illustrative examples of a clustering coefficient 1005 for trained and untrained neural network devices that include node assembly connectivity and—for the sake of comparison—a clustering coefficient 1010 for a network with random connectivity with the same pairwise connection probability. As can be seen, the clustering coefficient with node assembly connectivity is distinguishably larger than the clustering coefficient with random connectivity.

In some implementations of trained and untrained neural network devices in which nodes within a node assembly are more likely to be linked than nodes in different node assemblies, the number of incoming connections per node decreases more rapidly than in power law scale-free networks.

Figure 11:
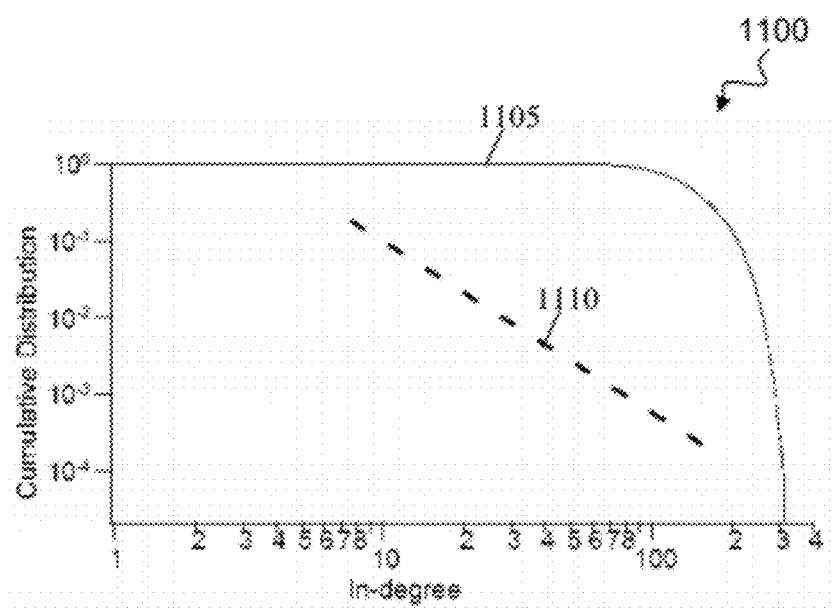
FIG. 11 is a graph 1100 that presents an illustrative plot 1105 of a cumulative distribution of incoming connections for neural network devices that include node assembly connectivity.

FIG. 11 is a graph 1100 that presents an illustrative plot 1105 of a cumulative distribution of incoming connections for trained and untrained neural network devices that include node assembly connectivity and—for the sake of comparison—a plot 1110 of the cumulative distribution of incoming connections in a power law scale-free network. As shown, in such scale-free networks, the power law is embodied in a straight line of decreasing slope in a log-log plot. On the other hand, the cumulative distribution of incoming connections shown plot 1105 is relatively constant but then decreases more rapidly on the log-log scale. This more rapid decrease mimic the morphological and other constraints on incoming connections in biological neurons. Examples of such constraints include dendritic arborization and the number of spines available for forming connections in biological neurons. Neural networks that embody such constraints contrast with scale-free networks in which a node is free to form a much larger number of interconnections and the number of connections per node has a much wider distribution.

In some implementations of trained and untrained neural network devices in which nodes within a node assembly are more likely to be linked than nodes in different node assemblies, both the number of pairs of nodes with many common neighbors and the number of pairs of nodes with few common neighbors is greater than in a random network.

Figure 12:
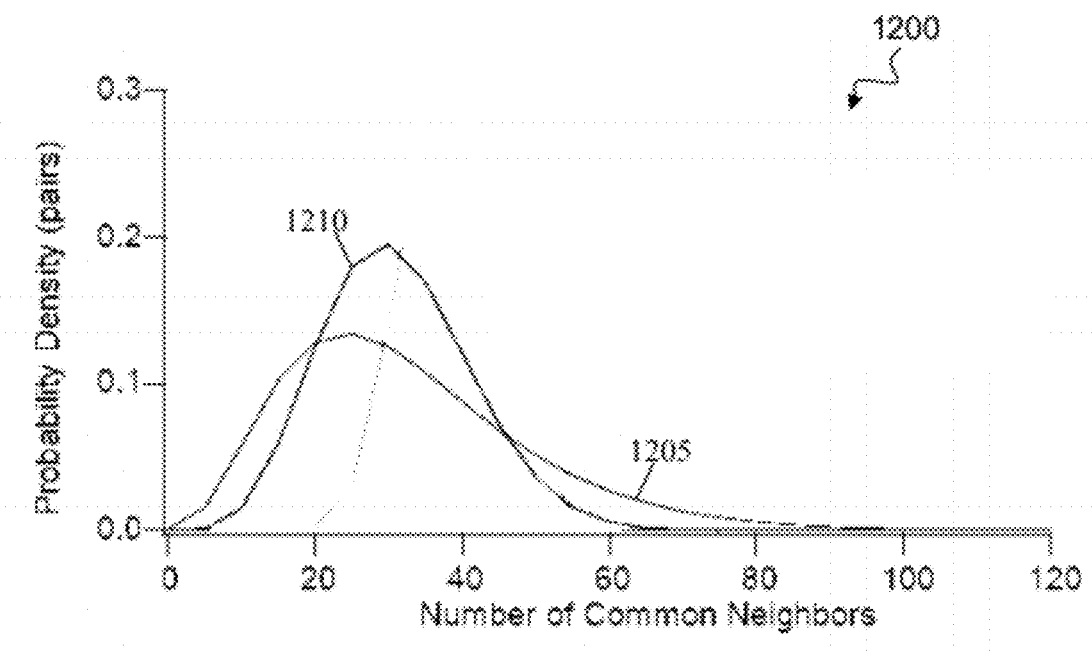
FIG. 12 is a graph that presents illustrative examples of a plot of a probability density distribution of the number of common neighbors shared by pairs of nodes for neural network devices that include node assembly connectivity.

FIG. 12 is a graph 1200 that presents illustrative examples of a plot 1205 of a probability density distribution of a number of common neighbors shared by pairs of nodes for trained and untrained neural network devices that include node assembly connectivity and—for the sake of comparison—a plot 1210 of the number of common neighbors shared by pairs of nodes in a network with random connectivity. As can be seen, the number of pairs of nodes with many common neighbors and the number of pairs of nodes with few common neighbors is greater than in a random network.

Figure 13:
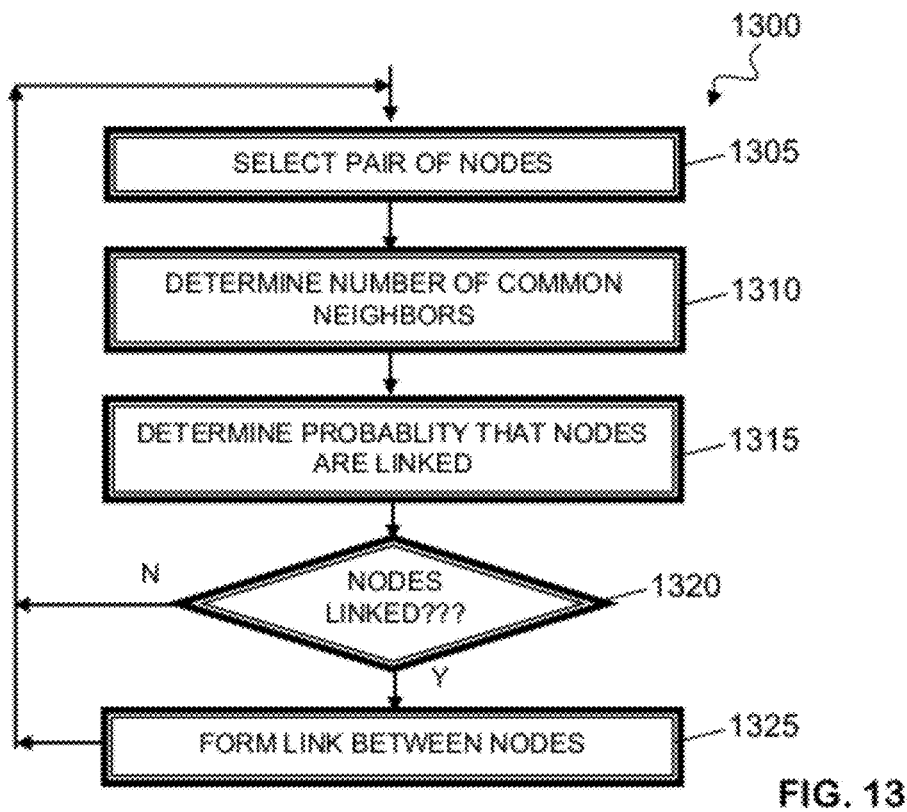
FIG. 13 is a flowchart of a process that can be used to organize neural network devices.

Neural network devices can be organized to have one or more of the features described above. For example, FIG. 13 is a flowchart of a process 1300 that can be used to organize neural network devices. Process 1300 can be performed by a system of one or more data processing apparatus that perform operations in accordance with the logic of one or more sets of machine-readable instructions. For example, process 1300 can be performed by a system of one or more computers that execute software for organizing neural network devices before or during training.

The system performing process 1300 selects a pair of nodes from amongst a collection of nodes at 1305. The pair of nodes can be selected at random or following an organize approach for node selection, e.g., by traversing a multidimensional array of nodes. In some implementations, the collection of nodes from which the pair is selected is arrayed, e.g., in a probability space that embodies the likelihood that any pair of nodes is connected. The probability space can thus mimic systems of biological neurons in which the probability that neurons are connected is a function of the separation distance between the neurons. In some implementations, nodes are not periodically arrayed within the probability space. For example, in some implementations, different nodes can be provided with relatively small perturbation about otherwise periodic positions in the probability space. In other implementations, nodes can be assigned randomly to positions in the probability space.

The system performing process 1300 determines a number of common neighbors shared by the selected pair of nodes at 1310. The number of common neighbors can be determined from a record of the links that already exist within the collection of nodes.

The system performing process 1300 also determines the probability that the selected pair of nodes are linked at 1315. The determined probability embodies the number of common neighbors. For example, in some implementations, the probability is determined in accordance with the example connection probabilities provided in graphs 405, 410 (FIGS. 4A, 4B). In implementations in which the nodes are arrayed in a probability space that embodies the likelihood that any pair of nodes is connected, the number of common neighbors modifies the "raw" probabilities of the probability space.

Using the determined probability that the selected pair of nodes are linked, the system performing process 1300 also determines whether the selected nodes are to be linked at decision 1320. For example, a randomly chosen number can be compared to the probability that the selected pair of nodes are linked and, if the randomly chosen number falls within the probability, then the system determines that the nodes are to be linked.

In response to determining that the selected nodes are to be linked, the system performing process 1300 forms a links between the selected nodes at 1325 and returns to select another pair of nodes at 1305. The link can be formed, e.g., by recording an indication of the new link in a record of the links that exist within the collection of nodes. The record can be stored one or more data storage devices. In response to determining that the selected nodes are not to be linked, the system performing process 1300 returns to select another pair of nodes at 1305. At some point, after a sufficient density of links has been reached, the system exits process 1300 (not shown).

In some implementations, the system performing process 1300 determines different probabilities that the nodes are linked for different kinds of links at 1315. For example, the system may determine a first probability that the nodes are linked in a reciprocal relationship and a first probability that the nodes are linked in a non-reciprocal relationship. In some implementations, non-reciprocal relationship are about twice as common as the reciprocal relationships. Such different probabilities can be used in determining whether the selected nodes are to be linked at 1320. The kind of link formed at 1325 can accordingly embody the result. One example implementation of a process such as process 1300 is now presented as MATLAB code.

```
function [cells,conn,dist,p,pr,pnr]=RP_AssembleNet(d,nx,ny,nz,pair)
%'d' is the average distance between adjacent cells (36 usually)
%'nx' is the number of rows         (10 usually)
%'ny' is the number of columns      (10 usually)
%'nz' is the number of layers       (10 usually)
%'pair' relevance of pairwise patterns (0-no, 1-yes)
acc=1;                  %initialize counter variable
nc=nx*ny*nz;            %calculate total nuber of cells
pr=0;                   %initialize reciprocal connection probability
pnr=0;                  %initialize non-reciprocal connection probability
cells=zeros(nc,6);      %initialize cell information matrix
for(i=1:nx)                         %for each row
    for(j=1:ny)                     %for each column
        for(k=1:nz)                 %for each layer
            cells(acc,1)=i*d;       %define base x position
            cells(acc,2)=j*d;       %define base y position
            cells(acc,3)=k*d;       %define base z position
            acc=acc+1;              %increase counter for next cell
        end
    end
end
r=rand(nc,3)*30;                    %create random matrix in range 0-30
cells(:,1:3)=cells(:,1:3)+r;        %add jitter to cell positions in x,y and z
r=rand(nc)+eye(nc);                 %define random matrix with ones in
```

```
diagonal
                                        %       (to ignore autapses)
dist=zeros(nc,nc);                      %initialize distance matrix
for(i=1:nc)
    for(j=i+1:nc)                       %for every possible pair
        dx=cells(i,1)−cells(j,1);       %calculate dx
        dy=cells(i,2)−cells(j,2);       %calculate dy
        dz=cells(i,3)−cells(j,3);       %calculate dz
        dist(i,j)=sqrt(dx*dx+dy*dy+dz*dz);  %calculate distance
        dist(j,i)=dist(i,j);            %distance is simmetric
    end
end
pr=RP_DistprobPair(dist,2);      %reciprocal connection probability matrix
pnr=RP_DistprobPair(dist,1)/2;   %0.5*non-reciprocal connection prob.
matrix
p=pnr+pr;                         %probability of connection matrix
if(pair==0)                       %if pairwise connectivity is not relevant
    conn=r<p;                     %connectivity is defined by p
else                              %if pairwise relationship is relevant
    r=triu(r,1)+tril(ones(nc));            %define upper triangular random matrix
    cr=r<pr;                               %define reciprocal connections
    cnr1=(r<(pr+pnr)).*(r>=(pr));          %define non reciprocal one-way
    cnr2=(r<(pr+2*pnr).*(r>=(pr+pnr)));    %define non reciprocal other-way
    conn=cr+cr'+cnr1+cnr2';                %final connectivity
end
```

Figure 14:
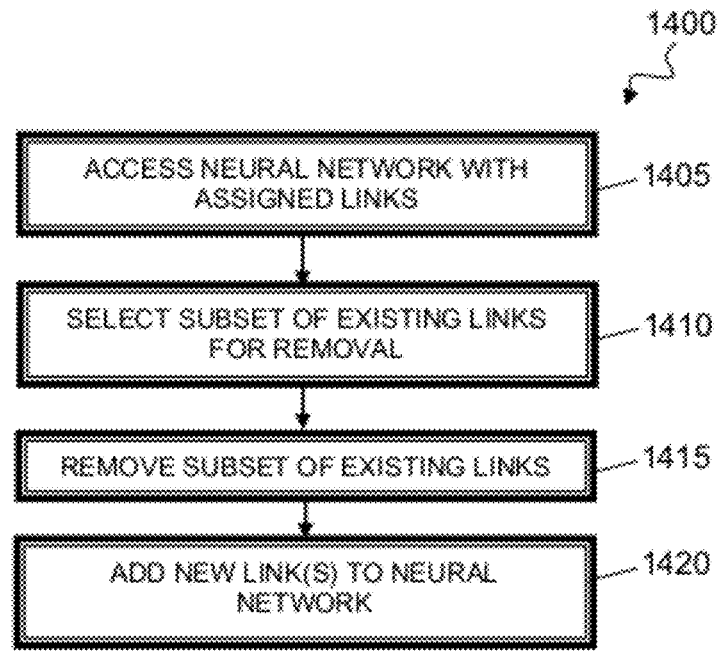
FIG. 14 is a flowchart of a process that can be used to reassign links and organize neural network devices.

As described above, in some implementations, a reassignment process can also be used. For example, FIG. 14 is a flowchart of a process 1400 that can be used to reassign links and organize neural network devices. Process 1400 can be performed by a system of one or more data processing apparatus that perform operations in accordance with the logic of one or more sets of machine-readable instructions. For example, process 1400 can be performed by a system of one or more computers that execute software for organizing neural network devices before or during training. Process 1400 can be performed in isolation or in conjunction with other activities. For example, in some implementations, process 1400 can be performed in conjunction with process 1300 (FIG. 13).

The system performing process 1400 accesses a characterization of a neural network that has links assigned to nodes at 1405. The links can have an initial density within the network. In some implementations, the accessed network is completely untrained. In other implementations, the accessed network is partially trained or sufficiently well-trained to achieve appropriate processing results.

The system performing process 1400 selects a subset of the links within the neural network at 1410. In some implementations, one or more links are selected by comparing the likelihood that a new link would be formed between those two nodes, e.g., if the remainder of the neural network were to remain unchanged. In such implementations, the links that would have the lowest likelihood of being newly formed can be preferentially selected. In some implementations, one or more links are selected by determining the contribution of the links to the information processing or information storage for which the neural network is partially or completely trained. In such implementations, the links that make the smallest contributions to the information processing or information storage (e.g., have the lowest weights) can be preferentially selected. In some implementations, one or more links are preferentially selected based on both the likelihood that the link would be newly formed and the link's contribution to information processing or information storage.

The system performing process 1400 removes the selected subset of links from the neural network at 1415. For example, the link can be removed from a record of the links within the neural network. Such as record can be stored one or more data storage devices. The system performing process 1400 also adds one or more new links to the neural network at 1420. For example, in some implementations, the system can use a process such as process 1300 to determine whether a selected pair of nodes is to be linked and to form one or more new links. In some implementations, the number of new links added to the neural network balances the number of links removed from the neural network so that the overall link density within the neural network is conserved.

In some implementations, the system performing process 1400 repeatedly selects, removes, and adds links until the neural network reaches a quasi steady-state in, e.g., clustering coefficient or a connectivity structure. For example, in some implementations, the nodes which are selected for removal at 1410 have likelihoods of being newly formed that are comparable to or greater than the likelihoods of the new nodes which are added at 1420. As another example, in some implementations, the nodes which are selected for removal at 1410 make contributions to information processing or storage that are comparable to or greater than the contributions to information processing or storage made by the new nodes added at 1420 after further training.

One example implementation of a process such as process 1400 is now presented as MATLAB code.

MATLAB code of the network reorganization function used to model the effects of common neighbors.

```
function conn2=Reorganize(conn,iter,r,m,p,pr,pnr,dist)
% 'conn' is the initial binary connectivity matrix (nxn)
% 'iter' is the number of iterations to perform (scalar)
% 'r' is the power given to the reorganization matric to (scalar)
```

-continued

```
% 'm' mean weight factor before applying power (scalar)
% 'p' is the probability of connection as a function of distance applied
to
%each pair (nxn)
% 'pr' is the reciprocal probability of connection as a function of
distance
%applied to each pair (nxn)
% 'pnr' is the non-reciprocal probability of connection as a function of
%distance applied to each pair (nxn)
% 'dist' is the distance between the nodes in each pair (nxn)
n=length(conn);              %number of cells
ins=sum(conn);               %array of column sums to determine
                             %number of inputs per cell
pc=n*(n-1);                  %number of possible connections
nc=sum(sum(conn));           %number of actual connections
conn0=conn;                  %storing initial connectivity
conn2=conn;                  %allocating final connectivity
pp=p;                        %storing p
for(i=1:iter)
    conn=double(conn2);      %to operate on results of last iteration
    cn=getNCN(conn);         %get common neighbors
    for(j=1:n)
        cn(:,j)=cn(:,j)/(m*mean(cn(:,j)));   %divide common neighbors by
                                             %the weighted mean
        cn(:,j)=cn(:,j).^r;                  %apply power
        cn(:,j)=cn(:,j).*pp(:,j);            %keep distance relations
        cn(:,j)=cn(:,j)./sum(cn(:,j));       %normalize to 1
        cn(:,j)=cn(:,j)*ins(j);              %to keep total inputs constant
    end
    pi=(cn+cn')/2;           %extract connection probability weight in each
pair
    cpnr=pnr./p.*pi;         %define non-reciprocal connection probability
    cpr=pr./p.*pi;           %define reciprocal connection probability
    rnd=rand(n);                         %define random matrix
    rnd=triu(rnd,1)+tril(ones(n));       %make it upper triangular
    cr=rnd<cpr;                          %reciprocal connections
    cnr1=(rnd<(cpr+cpnr)).*(rnd>=(cpr)); %non-reciprocal one way
    cnr2=(rnd<(cpr+2*cpnr)).*(rnd>=(cpr+cpnr));  %non-reciprocal other way
    conn2=cr+cr'+cnr1+cnr2'; %final connectivity
end
```

Neural network devices that are organized using either or both of processes 1300, 1400 can also be trained. The training adapts the weights of links between nodes to achieve a desired information processing or information storage result. In some implementations, such training adapts the weights of links between node assemblies to a larger extent than the weights of links within node assemblies.

Figure 15:
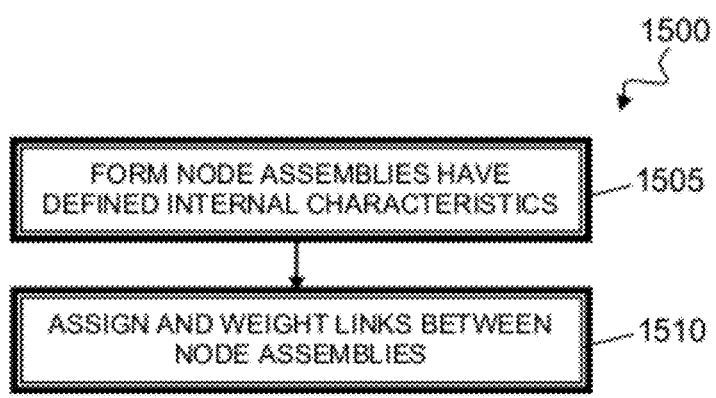
FIG. 15 is a flowchart of a process for forming a neural network device.

FIG. 15 is a flowchart of a process 1500 for forming a neural network device. Process 1500 can be performed by a system of one or more data processing apparatus that perform operations in accordance with the logic of one or more sets of machine-readable instructions. For example, process 1500 can be performed by a system of one or more computers that execute software for organizing neural network devices before or during training. Process 1500 can be performed in isolation or in conjunction with other activities. For example, in some implementations, process 1500 can be performed in conjunction with one or both of processes 1300, 1400 (FIGS. 13, 14).

The system performing process 1500 forms a group of node assemblies have defined internal characteristics at 1505. The internal characteristics of a node assembly are characteristics of the nodes and the links within the node assembly and excludes, e.g., the arrangement and weights of links between different node assemblies.

In some implementations, the different node assemblies can be defined to have relatively stable and reproducible internal characteristics. The internal characteristics can be stable in that training a neural network device formed from such node assemblies has a relatively minor impact on the arrangement and weights of links within the individual node assemblies. The internal characteristics can be reproducible in that the organization and weighting of the node assemblies can consistently embody different design rules. Examples of design rules for arriving at such characteristics include one or more of the illustrative examples presented in FIGS. 2-12 and described above. The group of node assemblies can be formed by processes that include new link formation and reassignment. For example, the group of node assemblies can be formed using process 1300 (FIG. 13), process 1400 (FIG. 14), or a combination of processes 1300, 1400 (FIGS. 13, 1400).

One example of an internal characteristic that can be defined is the level of activity in each node assembly. The level of activity of each respective node assembly can be defined to embody, e.g., the number of nodes within that node assembly, the number of links within that node assembly, the weights of the links within that node assembly, or combinations of two or more of these features. For example, in some implementations, node assemblies in which the weights of the within-assembly links approaches an upper limit (or saturation level) for the neural network device can be formed for given numbers of nodes and within-assembly links.

Figure 16:
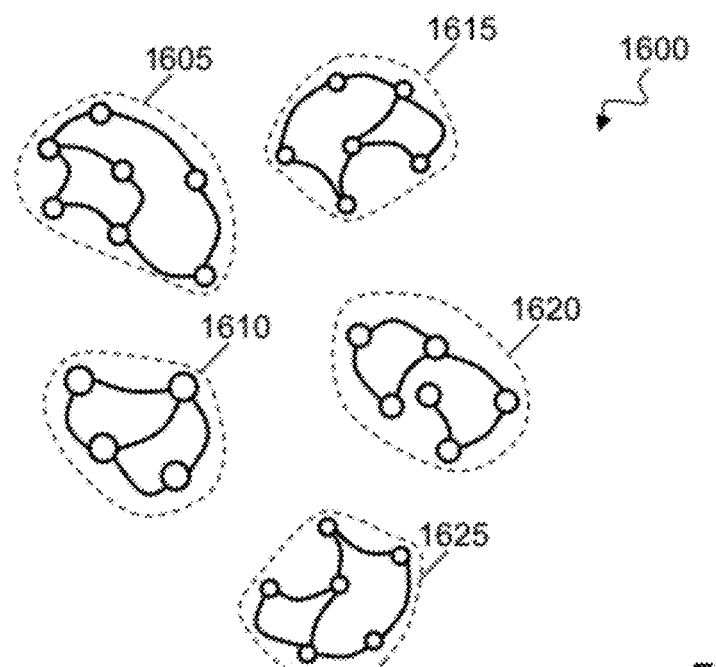
FIG. 16 is a schematic representation of an example group of node assemblies.

FIG. 16 is a schematic representation of an example group 1600 of node assemblies. Group 1600 includes node assemblies 1605, 1610, 1615, 1620, 1625. Node assemblies 1605, 1610, 1615, 1620, 1625 can have relatively stable and reproducible internal characteristics, including, e.g., illustrative examples of characteristics presented, e.g., in FIGS. 2-12 and described above. For example, in some implementations, the weights of the within-assembly links in all of node assemblies 1605, 1610, 1615, 1620, 1625 approaches an upper limit (or saturation level) for the neural network device.

Returning to FIG. 15, the system performing process 1500 assigns and weights links between node assemblies to achieve desired information processing or information storage results at 1510. The assignment and weighting thus trains the neural network device. The training is preferentially embodied in the links between node assemblies rather than in the (relatively more stable) links within the node assemblies. In some implementations, the assignment and weighting can include new between-assembly link formation, reassignment of between-assembly links, or both formation and reassignment of between-assembly links.

Figure 17:
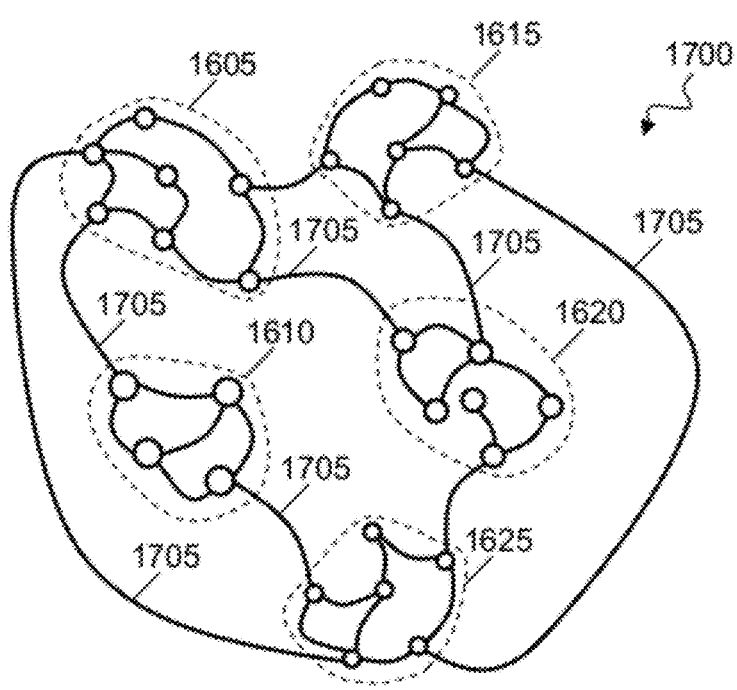
FIG. 17 is a schematic representation of an example neural network device.

FIG. 17 is a schematic representation of an example neural network device 1700 in which such between-assembly links 1705 have been formed between node assemblies 1605, 1610, 1615, 1620, 1625. The arrangement and the weight of the between-assembly links 1705 can embody the training that tailors neural network device 1700 to achieve desired information processing or information storage results.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A neural network device implemented in hardware or in a combination of hardware and software, comprising:
a collection of node assemblies interconnected by between-assembly links, each node assembly itself comprising a network of nodes interconnected by a plurality of within-assembly links, wherein each of the between-assembly links and the within-assembly links have an associated weight, each weight embodying a strength of connection between the nodes joined by the associated link, the nodes within each assembly being more likely to be connected to other nodes within that assembly than to be connected to nodes within others of the node assemblies, wherein the nodes are connected and the nodes assemblies are formed according to pairwise connectivity profiles, wherein the likelihood of a connection between a pair of nodes is positively correlated with the number of common neighbors shared by the nodes in the pair.

2. The neural network device of claim 1, wherein the weights associated with the between-assembly links embody training of the neural network device to a particular purpose.

3. The neural network device of claim 2, wherein the within-assembly links embody the training of the neural network device to the particular purpose to a lesser extent than the between-assembly links.

4. The neural network device of claim 1, wherein the nodes are connected and the node assemblies formed according to pairwise connectivity profiles.

5. The neural network device of claim 1, wherein the variance in average weight within each of the node assemblies generally decreases for node assemblies having higher numbers of links.

6. The neural network device of claim 1, wherein the average strength of interconnection with each respective node assembly asymptotically approaches a respective limit as the number of links within the respective node assembly exceeds the number of nodes within the respective node assembly.

7. The neural network device of claim 6, wherein the respective limits of the respective node assemblies are substantially identical when more than one interconnection exist.

8. The neural network device of claim 1, wherein, for node assemblies having a number of within-assembly links that is smaller than a number of nodes within the same node assembly, magnitudes of the weights of the within-assembly links are associated with distinguishably discrete levels of a set of levels.

9. The neural network device of claim 8, wherein each discrete level is associated with a different number of nodes within the assembly.

10. The neural network device of claim 1, further comprising an adaptor component configured to change the magnitude of each weight of the within-assembly links based on a number of other nodes within the assembly of each within-assembly link.

11. The neural network device of claim 10, wherein the adaptor component is configured to change the magnitude of each weight before the neural network device is trained.

12. The neural network device of claim 1, wherein the neural network device is untrained.

13. The neural network device of claim 1, further comprising an adaptor component configured to change a probability of connection between nodes in each node assembly based on a number of nodes within the node assembly.

14. The neural network device of claim 13, wherein the adaptor component is configured to change the magnitude of each weight before the neural network device is trained.

15. The neural network device of claim 1, wherein the links comprise reciprocal links and non-reciprocal links.

16. The neural network device of claim 15, wherein the non-reciprocal links are about twice as common as the reciprocal links.

17. The neural network device of claim 1, wherein the nodes within each assembly are about twice as likely to be connected to other nodes within that assembly than to be connected to nodes within others of the node assemblies.

18. The neural network device of claim 1, wherein a number of node assemblies having between ten and 100 nodes is greater than a number of node assemblies having less than ten and more than 100 nodes.

19. The neural network device of claim 1, wherein there are between ten and 100 node assemblies.

20. A machine-implemented method of forming a neural network device, the method comprising:
  forming a network of nodes implemented in hardware or in a combination of hardware and software; and
  assigning or reassigning links between nodes of the network by connecting or disconnecting nodes with a probability that embodies a number of common neighbors shared by the nodes such that the network of nodes are formed according to pairwise connectivity profiles, wherein the likelihood of a connection between a pair of nodes is positively correlated with the number of common neighbors shared by the nodes in the pair, and wherein after the assigning or the reassigning, the network of nodes comprises a collection of node assemblies interconnected by between-assembly links, each node assembly itself comprising a network of nodes interconnected by a plurality of within-assembly links, wherein each of the between-assembly links and the within-assembly links have an associated weight, each weight embodying a strength of connection between the nodes joined by the associated link, the nodes within each assembly being more likely to be connected to other nodes within that assembly than to be connected to nodes within others of the node assemblies.

21. The method of claim 20, further comprising repeating the assigning or reassigning until quasi steady-state is reached.

22. The method of claim 21, wherein the quasi steady-state comprises the pair-wise connectivity profiles of the neural network device.

23. The method of claim 20, further comprising training the network of nodes.

24. The method of claim 23, wherein training the network of nodes comprises:
  weighting links within the node assemblies with relatively stable weights; and
  weighting links between node assemblies to embody the training while leaving the weights of links within the node assemblies relatively unchanged.

25. The method of claim 20, further comprising assigning weights to each link between first and second nodes based on a number of nodes commonly connected to both the first and second nodes.

26. The method of claim 20, further comprising assigning an initial set of links according to either a random assignment processes or a process in which link assignments are made in accordance with a probability of two nodes being linked.

27. The method of claim 20, wherein the method forms an untrained neural network device.

28. The method of claim 20, further comprising repeating the assigning or reassigning until the number of links within each respective node assembly exceeds the number of nodes within that respective node assembly.

29. The method of claim 28, further comprising weighting links in each of the respective node assemblies with weights that approach limits as the number of links exceeds the number of nodes.

30. The method of claim 29, wherein the limits for node assemblies of different sizes are substantially the same.

* * * * *